(12) United States Patent
Xiao et al.

(10) Patent No.: US 11,662,558 B2
(45) Date of Patent: May 30, 2023

(54) CAMERA LENS GROUP

(71) Applicant: Zhejiang Sunny Optical Co., Ltd, Ningbo (CN)

(72) Inventors: Haidong Xiao, Ningbo (CN); Kaiyuan Zhang, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 431 days.

(21) Appl. No.: 17/036,881

(22) Filed: Sep. 29, 2020

(65) Prior Publication Data

US 2021/0124152 A1 Apr. 29, 2021

(30) Foreign Application Priority Data

Oct. 28, 2019 (CN) .......................... 201911030606.9

(51) Int. Cl.
  *G02B 13/00* (2006.01)
  *G02B 9/60* (2006.01)
  *G02B 27/00* (2006.01)

(52) U.S. Cl.
  CPC .......... *G02B 13/0045* (2013.01); *G02B 9/60* (2013.01); *G02B 27/0025* (2013.01)

(58) Field of Classification Search
  CPC . H01M 8/0631; A61K 2300/00; A61K 31/19; A61K 31/192; A61K 31/215; A61K 31/351; A61K 31/424; A61K 31/43; A61K 31/4439; A61K 31/7048; A61K 45/06; A61P 31/16; C07B 2200/13; C07D 281/10; C07K 1/061; C07K 1/306; C07K 5/06026; C07K 5/06078; C12Q 1/6883; C12Q 2600/156; C12Q 2600/158; C12Q 2600/172; G02B 13/0045; G02B 27/0025; G02B 9/60; H03K 27/00; Y02E 60/50
  See application file for complete search history.

(56) References Cited

U.S. PATENT DOCUMENTS

2013/0308206 A1* 11/2013 Hsu .................... G02B 13/0045
                                                            359/714

* cited by examiner

*Primary Examiner* — Joseph P Martinez
*Assistant Examiner* — Vipin Patel
(74) *Attorney, Agent, or Firm* — Sughrue Mion, PLLC

(57) ABSTRACT

The present disclosure discloses a camera lens group including, sequentially from an object side to an image side along an optical axis, a first lens having refractive power with a concave image-side surface; a stop; a second lens having positive refractive power with a convex image-side surface; a third lens having refractive power with a concave image-side surface; a fourth lens having positive refractive power with a convex image-side surface; and a fifth lens having negative refractive power with a convex object-side surface and a concave image-side surface. A maximum effective radius DT11 of an object-side surface of the first lens and half of a maximal field-of-view Semi-FOV of the camera lens group satisfy: $2.50 \text{ mm}^{-1} < \tan^2(\text{Semi-FOV})/\text{DT11} < 5.00 \text{ mm}^{-1}$.

20 Claims, 12 Drawing Sheets

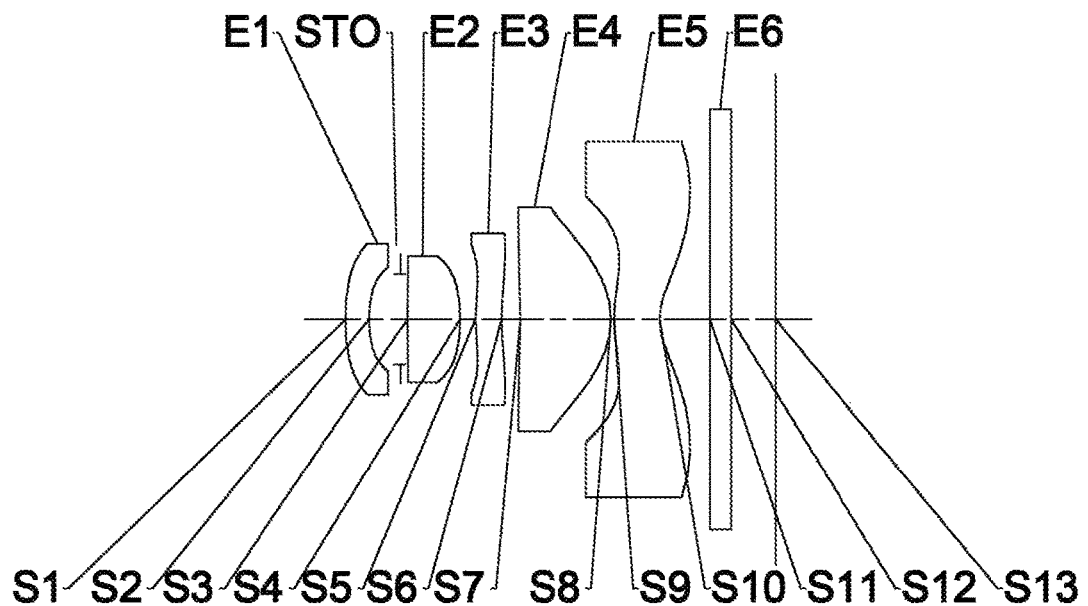
Fig. 9
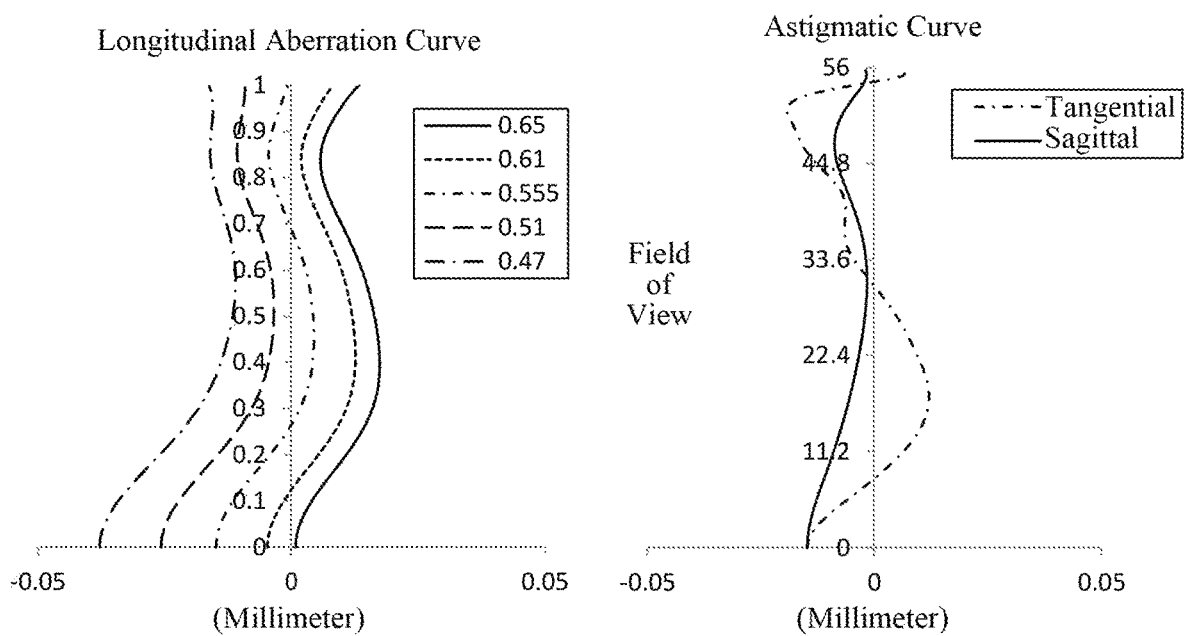
Fig. 10A
Fig. 10B

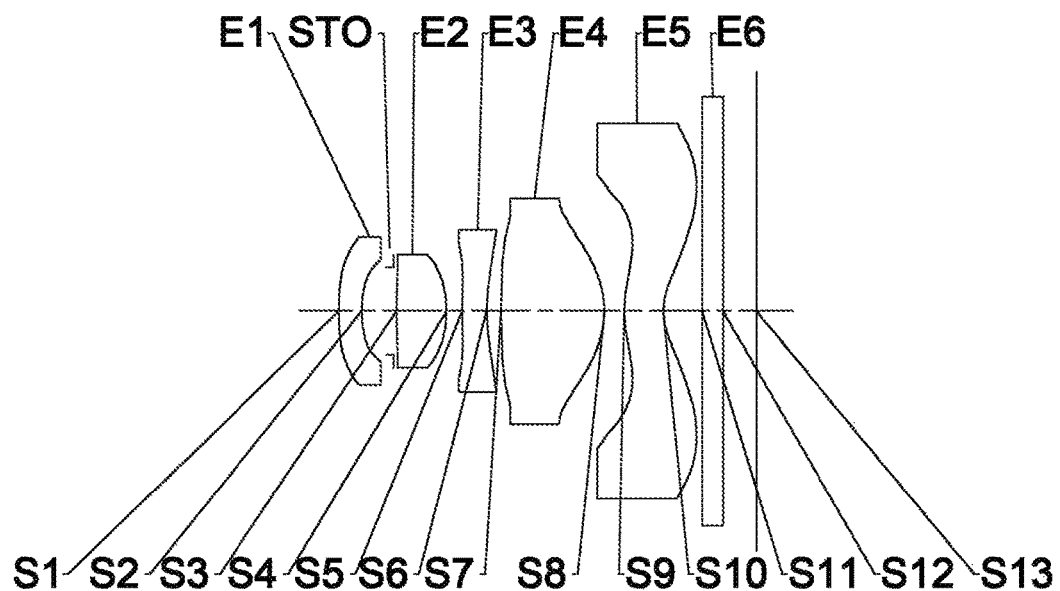
Fig. 13
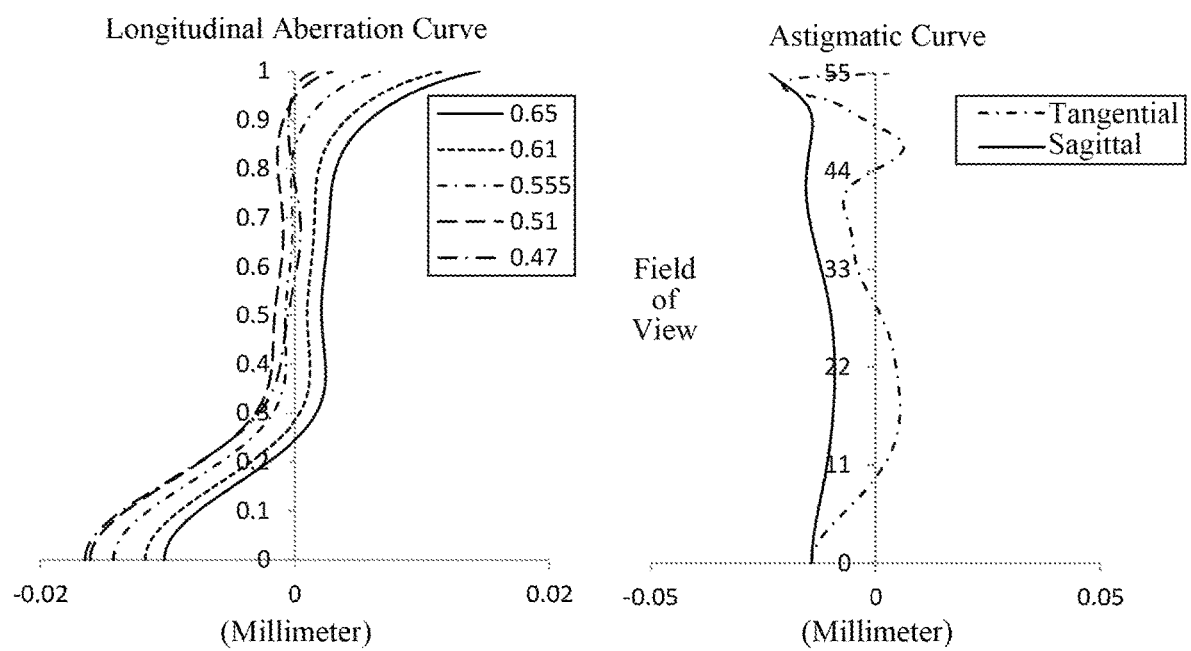
Fig. 14A
Fig. 14B

CAMERA LENS GROUP

CROSS-REFERENCE TO RELATED APPLICATION

This application claims benefit of priority to Chinese Patent Application No. 201911030606.9 filed on Oct. 28, 2019 before the China National Intellectual Property Administration, the entire disclosure of which is incorporated herein by reference in its entity.

TECHNICAL FIELD

The present disclosure relates to the field of optical elements, and specifically, relates to a camera lens group.

BACKGROUND

With the continuous development of the shooting technology of portable electronic products, such as smart phones, the camera module has gradually developed from single-camera and dual-camera to three-camera and four-camera. It has become a mainstream trend for the portable electronic products to equip with at least one ultra-wide-angle lens assembly. Due to the increase in the number of lenses, the camera module requires a lens assembly with small front end to control the size of the module, so as to leave installation space for other modules of the mobile phone terminal.

SUMMARY

The present disclosure provides a camera lens group which includes, sequentially from an object side to an image side along an optical axis, a first lens having refractive power with a concave image-side surface; a stop; a second lens having positive refractive power with a convex image-side surface; a third lens having refractive power with a concave image-side surface; a fourth lens having positive refractive power with a convex image-side surface; and a fifth lens having negative refractive power with a convex object-side surface and a concave image-side surface.

In one embodiment, a maximum effective radius DT11 of an object-side surface of the first lens and half of a maximal field-of-view Semi-FOV of the camera lens group may satisfy: $2.50 \text{ mm}^{-1} < \tan^2(\text{Semi-FOV})/\text{DT11} < 5.00 \text{ mm}^{-1}$.

In one embodiment, a distance TTL along the optical axis from an object-side surface of the first lens to an imaging plane of the camera lens group, half of a diagonal length ImgH of an effective pixel area on the imaging plane of the camera lens group and a total effective focal length f of the camera lens group may satisfy: $2.50 \text{ mm} < \text{TTL}/\text{ImgH} * f < 4.00 \text{ mm}$.

In one embodiment, an effective focal length f2 of the second lens and a total effective focal length f of the camera lens group may satisfy: $0.50 < f2/f < 2.00$.

In one embodiment, a radius of curvature R9 of the object-side surface of the fifth lens and a radius of curvature R10 of the image-side surface of the fifth lens may satisfy: $1.50 < R9/R10 < 2.50$.

In one embodiment, a center thickness CT3 of the third lens along the optical axis and a spaced interval T34 between the third lens and the fourth lens along the optical axis may satisfy: $1.00 < CT3/T34 < 2.50$.

In one embodiment, a radius of curvature R6 of the image-side surface of the third lens and a center thickness CT3 of the third lens along the optical axis may satisfy: $7.00 < R6/CT3 < 11.00$.

In one embodiment, SAG42, being a distance along the optical axis from an intersection of the image-side surface of the fourth lens and the optical axis to a vertex of an effective radius of the image-side surface of the fourth lens, and SAG51, being a distance along the optical axis from an intersection of the object-side surface of the fifth lens and the optical axis to a vertex of an effective radius of the object-side surface of the fifth lens, may satisfy: $1.00 < (SAG42+SAG51)/(SAG42-SAG51) < 4.00$.

In one embodiment, a distance TD along the optical axis from an object-side surface of the first lens to the image-side surface of the fifth lens and a sum of spaced intervals $\Sigma AT$ along the optical axis between each two adjacent lenses of the first lens to the fifth lens may satisfy: $\Sigma AT/TD \leq 0.30$.

In one embodiment, a maximum effective radius DT11 of an object-side surface of the first lens and a maximum effective radius DT12 of the image-side surface of the first lens may satisfy: $4.50 < (DT11+DT12)/(DT11-DT12) < 8.00$.

In one embodiment, a radius of curvature R6 of the image-side surface of the third lens and a radius of curvature R9 of the object-side surface of the fifth lens may satisfy: $2.00 < (R6+R9)/(R6-R9) < 5.50$.

In one embodiment, half of a maximal field-of-view Semi-FOV of the camera lens group may satisfy: $2.00 < \tan^2(\text{Semi-FOV}) < 4.00$.

The present disclosure employs five lenses, and the camera lens group has at least one beneficial effect, such as small front end, large field-of-view angle, and high image quality, by rationally adjusting the aperture of the first lens and reasonably configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent by reading the detailed description of the non-limiting embodiments with reference to the accompanying drawings:

FIG. 9 illustrates a schematic structural view of a camera lens group according to example 5 of the present disclosure;

FIGS. 10A to 10D illustrate a longitudinal aberration curve, an astigmatic curve, a distortion curve, and a lateral color curve of the camera lens group of the example 5, respectively;

FIG. 13 illustrates a schematic structural view of a camera lens group according to example 7 of the present disclosure;

FIGS. 14A to 14D illustrate a longitudinal aberration curve, an astigmatic curve, a distortion curve, and a lateral color curve of the camera lens group of the example 7, respectively;

DETAILED DESCRIPTION OF EMBODIMENTS

Figure 1:
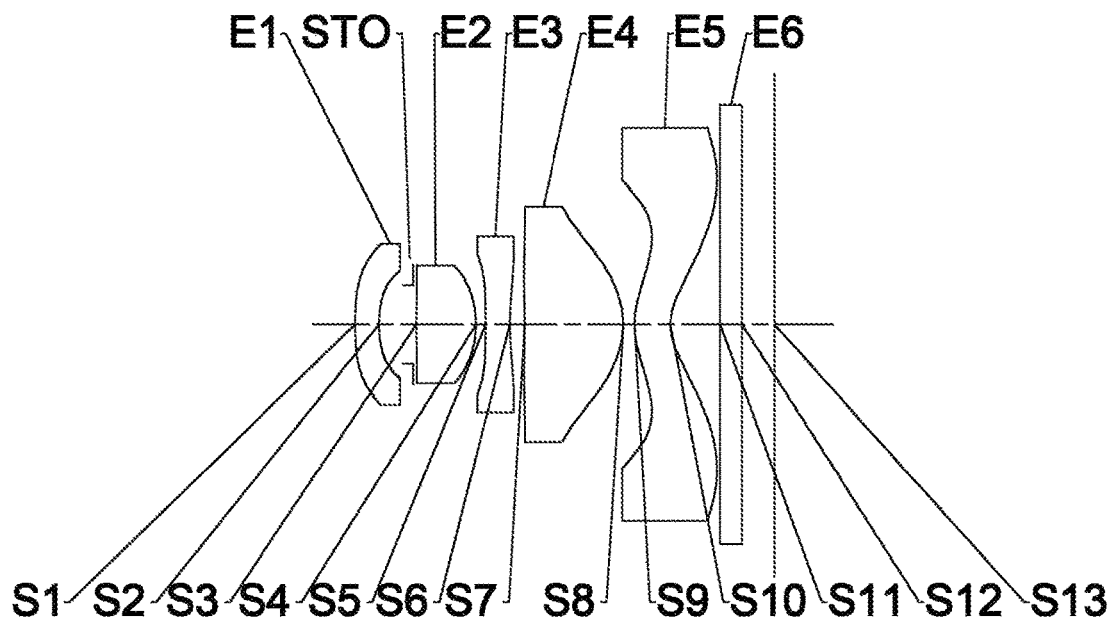
FIG. 1 illustrates a schematic structural view of a camera lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include five lenses having refractive power, which are a first lens, a second lens, a third lens, a fourth lens and a fifth lens. The five lenses are arranged sequentially from an object side to an image side along an optical axis. Among the first lens to the fifth lens, there may be a spaced interval between each two adjacent lenses.

In an exemplary embodiment, the first lens has refractive power, and an image-side surface thereof may be a concave surface; the second lens may have positive refractive power, and an image-side surface thereof may be a convex surface; the third lens has refractive power, and an image-side surface thereof may be a concave surface; the fourth lens may have positive refractive power, and an image-side surface thereof may be a convex surface; and the fifth lens may have negative refractive power, an object-side surface thereof may be a convex surface, and an image-side surface thereof may be a concave surface.

In an exemplary embodiment, the camera lens group according to the present disclosure may satisfy: $2.50 \text{ mm}^{-1} < \tan^2(\text{Semi-FOV})/DT11 < 5.00 \text{ mm}^{-1}$, where DT11 is a maximum effective radius of an object-side surface of the first lens, and Semi-FOV is half of a maximal field-of-view of the camera lens group. When $2.50 \text{ mm}^{-1} < \tan^2(\text{semi-FOV})/DT11 < 5.00 \text{ mm}^{-1}$ is satisfied, the radius of the object-side surface of the first lens can be reduced while ensuring the large field-of-view angle of the camera lens group, thereby reducing the window area of the camera lens group and realizing an ultra-small front end of the camera lens group.

In an exemplary embodiment, the camera lens group according to the present disclosure may satisfy: $2.50 \text{ mm} < TTL/ImgH*f < 4.00 \text{ mm}$, where TTL is a distance along the optical axis from an object-side surface of the first lens to an imaging plane of the camera lens group, ImgH is half of a diagonal length of an effective pixel area on the imaging plane of the camera lens group, and f is a total effective focal length of the camera lens group. More specifically, TTL, ImgH, and f may further satisfy: $2.50 \text{ mm} < TTL/$ ImgH*f<3.50 mm. When 2.50 mm<TTL/ImgH*f<4.00 mm is satisfied, the total size of the camera lens group may be effectively reduced to achieve the miniaturization of the camera lens group, and the focal length of the camera lens group may be effectively controlled to achieve clear imaging for both near and far scenes.

In an exemplary embodiment, the camera lens group according to the present disclosure may satisfy: 0.50<f2/f<2.00, where f2 is an effective focal length of the second lens, and f is a total effective focal length of the camera lens group. More specifically, f2 and f may further satisfy: 0.80<f2/f<1.80. When 0.50<f2/f<2.00 is satisfied, the on-axis spherical aberration generated by the second lens may be constrained within a reasonable range, such that the image quality of the on-axis field-of-view is ensured.

In an exemplary embodiment, the camera lens group according to the present disclosure may satisfy: 1.50<R9/R10<2.50, where R9 is a radius of curvature of the object-side surface of the fifth lens, and R10 is a radius of curvature of the image-side surface of the fifth lens. Satisfying 1.50<R9/R10<2.50 may ensure that the surface of the fifth lens of the camera lens group is smooth, which is beneficial to the molding and manufacturing of the fifth lens with a relatively large aperture.

In an exemplary embodiment, the camera lens group according to the present disclosure may satisfy: 1.00<CT3/T34<2.50, where CT3 is a center thickness of the third lens along the optical axis, and T34 is a spaced interval between the third lens and the fourth lens along the optical axis. More specifically, CT3 and T34 may further satisfy: 1.20<CT3/T34<2.20. When 1.00<CT3/T34<2.50 is satisfied, the field curvature of the camera lens group may be effectively controlled, so that the camera lens group has a reasonable field curvature.

In an exemplary embodiment, the camera lens group according to the present disclosure may satisfy: 7.00<R6/CT3<11.00, where R6 is a radius of curvature of the image-side surface of the third lens, and CT3 is a center thickness of the third lens along the optical axis. Satisfying 7.00<R6/CT3<11.00 may be beneficial to ensuring the processing, molding and assembly of the third lens, so that the good image quality of camera lens group may be obtained, and the problems such as difficulty in forming the third lens surface and obvious deformation after assembly may be avoided.

In an exemplary embodiment, the camera lens group according to the present disclosure may satisfy: 1.00<(SAG42+SAG51)/(SAG42−SAG51)<4.00, where SAG42 is a distance along the optical axis from an intersection of the image-side surface of the fourth lens and the optical axis to a vertex of an effective radius of the image-side surface of the fourth lens, and SAG51 is a distance along the optical axis from an intersection of the object-side surface of the fifth lens and the optical axis to a vertex of an effective radius of the object-side surface of the fifth lens. Satisfying 1.00<(SAG42+SAG51)/(SAG42-SAG51)<4.00 may be beneficial to ensuring the processing and molding of the fourth lens and the fifth lens, so that the camera lens group may obtain a good imaging effect.

In an exemplary embodiment, the camera lens group according to the present disclosure may satisfy: $\Sigma AT/TD \leq 0.30$, where TD is a distance along the optical axis from an object-side surface of the first lens to the image-side surface of the fifth lens, and $\Sigma AT$ is a sum of spaced intervals along the optical axis between each two adjacent lenses of the first to the fifth lenses. More specifically, $\Sigma AT$ and TD may further satisfy: $0.15 \leq \Sigma AT/TD \leq 0.30$. When $\Sigma AT/TD \leq 0.30$ is satisfied, the spaced interval between the surfaces of the lens may be reasonably controlled to avoid excessive light deflection. At the same time, it is beneficial to reduce the processing difficulty of the camera lens group.

In an exemplary embodiment, the camera lens group according to the present disclosure may satisfy: 4.50<(DT11+DT12)/(DT11−DT12)<8.00, where DT11 is a maximum effective radius of an object-side surface of the first lens, and DT12 is a maximum effective radius of the image-side surface of the first lens. Satisfying 4.50<(DT11+DT12)/(DT11−DT12)<8.00 may be beneficial to reducing the size of the front end of the lens assembly. On the other hand, it can reasonably limit the range of incident light, eliminate poor-quality edge light, reduce off-axis aberrations, and effectively improve the resolution of the camera lens group.

In an exemplary embodiment, the camera lens group according to the present disclosure may satisfy: 2.00<(R6+R9)/(R6−R9)<5.50, where R6 is a radius of curvature of the image-side surface of the third lens, and R9 is a radius of curvature of the object-side surface of the fifth lens. When 2.00<(R6+R9)/(R6−R9)<5.50 is satisfied, the refractive power of the third lens and the fifth lens of the camera lens group may be reasonably distributed to effectively control the aberration correction.

In an exemplary embodiment, the camera lens group according to the present disclosure may satisfy: $2.00 < \tan^2(\text{Semi-FOV}) < 4.00$, where Semi-FOV is half of a maximal field-of-view of the camera lens group. When $2.00 < \tan^2(\text{Semi-FOV}) < 4.00$ is satisfied, the camera lens group has a large-scale scene shooting range up to 125.4°, which may effectively show large scenes. Compared with a conventional lens assembly with a small field-of-view, the camera lens group according to the present disclosure may emphasize the foreground and highlight the contrast between the near and the far scenes, thereby increasing the spatial depth of the shooting picture.

In an exemplary embodiment, the camera lens group according to the present disclosure may further include a stop disposed between the first lens and the second lens. Optionally, the above camera lens group may further include an optical filter for correcting the color deviation and/or a protective glass for protecting the photosensitive element located on an imaging plane.

The camera lens group according to the above embodiments of the present disclosure may employ a plurality of lenses, such as five lenses as described above. By properly configuring the refractive power of each lens, the surface shape, the center thickness of each lens, and spaced intervals along the optical axis between the lenses, the size of the camera lens group may be effectively reduced, and the workability of the camera lens group may be improved, such that the camera lens group is more advantageous for production processing and may be applied to portable electronic products. The camera lens group configured as described above may have the characteristics of ultra-small front end, ultra-large field-of-view angle, and good image quality and the like, which can well satisfy the use requirements of various portable electronic products in different shooting scenarios.

In the embodiments of the present disclosure, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking five lenses as an example, the camera lens group is not limited to include five lenses. The camera lens group may also include other numbers of lenses if desired.

Some specific examples of a camera lens group applicable to the above embodiment will be further described below with reference to the accompanying drawings.

Example 1

A camera lens group according to example 1 of the present disclosure is described below with reference to FIG. 1 to FIG. 2D. FIG. 1 shows a schematic structural view of the camera lens group according to example 1 of the present disclosure.

As shown in FIG. 1, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

Table 1 is a table illustrating basic parameters of the camera lens group of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.3872 | 0.2300 | 1.55 | 56.1 | −4.03 | 15.1045 |
| S2 | Aspheric | 1.3022 | 0.3283 | | | | 2.7311 |
| STO | Spherical | Infinite | 0.0300 | | | | |
| S3 | Aspheric | 8.9321 | 0.5719 | 1.55 | 56.1 | 1.69 | −62.1383 |
| S4 | Aspheric | −1.0039 | 0.0921 | | | | −0.6930 |
| S5 | Aspheric | 28.8668 | 0.2300 | 1.67 | 20.4 | −3.98 | 99.0000 |
| S6 | Aspheric | 2.4179 | 0.1431 | | | | 2.3323 |
| S7 | Aspheric | −7.7510 | 0.9531 | 1.54 | 55.9 | 1.63 | 60.9923 |
| S8 | Aspheric | −0.8178 | 0.1066 | | | | −0.9938 |
| S9 | Aspheric | 0.8705 | 0.3422 | 1.62 | 23.5 | −3.16 | −1.5076 |
| S10 | Aspheric | 0.5157 | 0.4763 | | | | −2.4033 |
| S11 | Spherical | Infinite | 0.2100 | 1.52 | 64.2 | | |
| S12 | Spherical | Infinite | 0.3121 | | | | |
| S13 | Spherical | Infinite | | | | | |

In this example, a total effective focal length f of the camera lens group is 1.57 mm, a total length TTL of the camera lens group (i.e., a distance along the optical axis from the object-side surface S1 of the first lens E1 to the imaging plane S13 of the camera lens group) is 4.03 mm, half of a diagonal length ImgH of an effective pixel area on the imaging plane S13 of the camera lens group is 2.42 mm, half of a maximal field-of-view Semi-FOV of the camera lens group is 62.7°, and an aperture value Fno of the camera lens group is 2.21.

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1+\sqrt{1-(k+1)c^2h^2}} + \Sigma A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

TABLE 2

| Surface number | A4 | A6 | A8 | A10 | A12 |
|---|---|---|---|---|---|
| S1 | 5.7819E−01 | −1.5481E+00 | 1.0289E+01 | −5.4219E+01 | 1.9174E+02 |
| S2 | 1.0873E+00 | −7.4310E+00 | 1.4317E+02 | −1.6523E+03 | 1.2275E+04 |
| S3 | −1.0220E−01 | 6.5403E−01 | −2.7337E+01 | 3.9542E+02 | −3.6908E+03 |
| S4 | −3.6157E−01 | −2.8362E−01 | 7.2043E+00 | −6.6964E+01 | 2.9165E+02 |
| S5 | −6.0152E−01 | −1.2462E−01 | 1.2661E+01 | −9.8588E+01 | 4.2628E+02 |
| S6 | −3.7513E−01 | −5.9614E−01 | 7.6476E+00 | −3.3858E+01 | 8.9315E+01 |
| S7 | 2.5301E−01 | −6.8245E−01 | 1.1150E+00 | 1.6743E+00 | −1.1408E+01 |
| S8 | 7.8637E−02 | 1.1368E−01 | −3.6799E−01 | 1.9434E−01 | 1.0611E+00 |
| S9 | −6.6706E−01 | 7.3875E−01 | −9.5502E−01 | 1.0480E+00 | −8.4283E−01 |
| S10 | −3.8289E−01 | 4.5401E−01 | −4.3503E−01 | 3.1060E−01 | −1.5772E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5347E+00 | 2.5960E+00 | −1.2818E+00 | 2.4294E−01 |
| S9 | 4.2344E−01 | −1.1756E−01 | 1.6017E−02 | −8.8994E−04 |
| S10 | 5.4343E−02 | −1.1964E−02 | 1.5101E−03 | −8.2792E−05 |

Figure 2A:
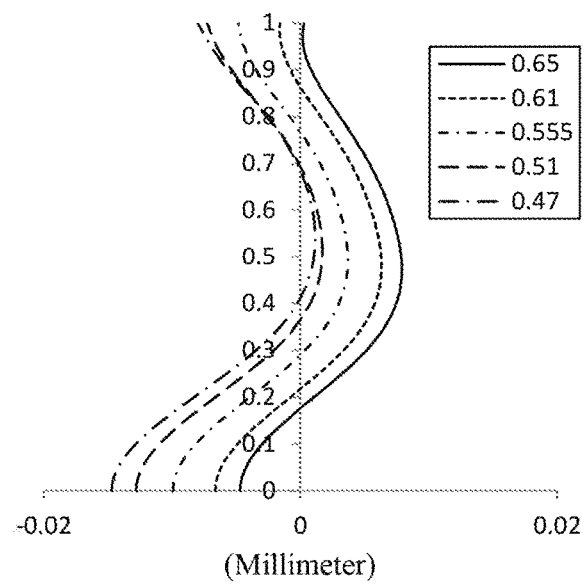
FIGS. 2A to 2D illustrate a longitudinal aberration curve, an astigmatic curve, a distortion curve, and a lateral color curve of the camera lens group of the example 1, respectively.
Figure 2B:
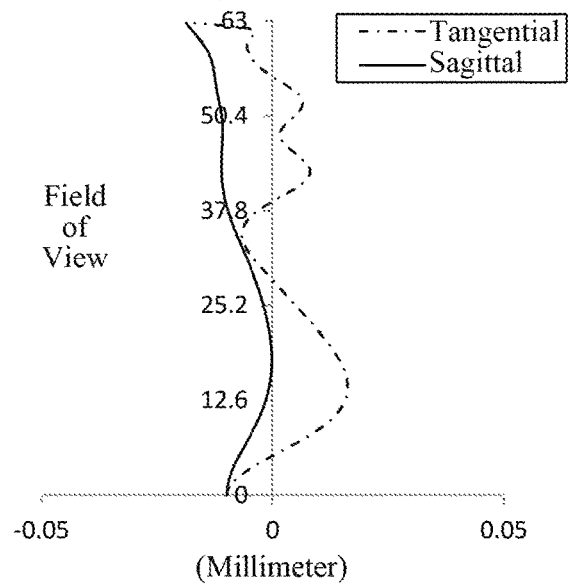
Figure 2C:
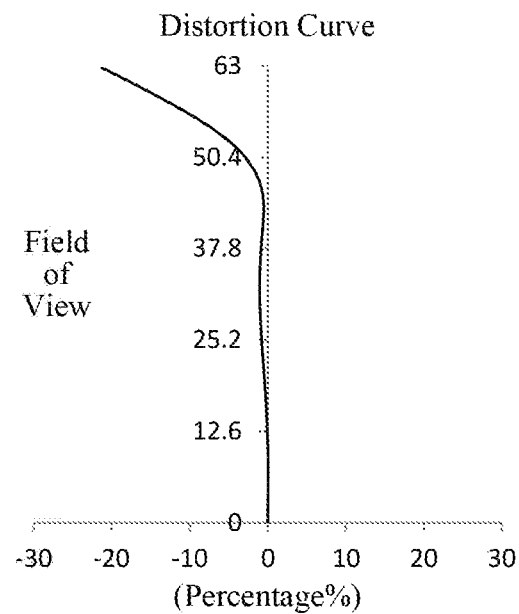
Figure 2D:
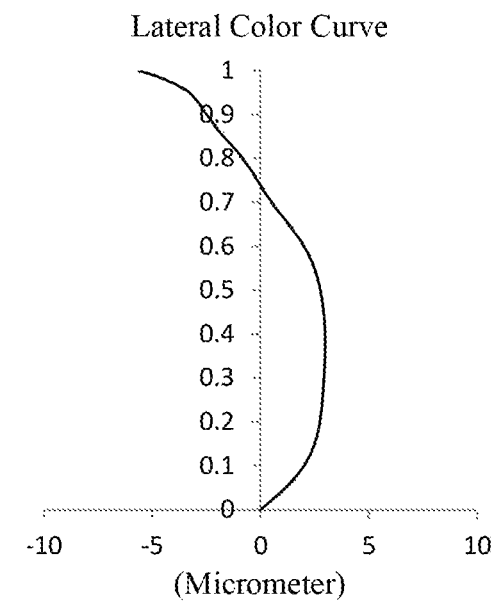

FIG. 2A illustrates a longitudinal aberration curve of the camera lens group according to example 1, representing deviations of focal points converged by light of different wavelengths after passing through the lens assembly. FIG. 2B illustrates an astigmatic curve of the camera lens group according to example 1, representing a curvature of a tangential plane and a curvature of a sagittal plane. FIG. 2C illustrates a distortion curve of the camera lens group according to example 1, representing amounts of distortion corresponding to different field-of-views. FIG. 2D illustrates a lateral color curve of the camera lens group according to example 1, representing deviations of different image heights on an imaging plane after light passes through the lens assembly. It can be seen from FIG. 2A to FIG. 2D that the camera lens group provided in example 1 may achieve good image quality.

Example 2

Figure 3:
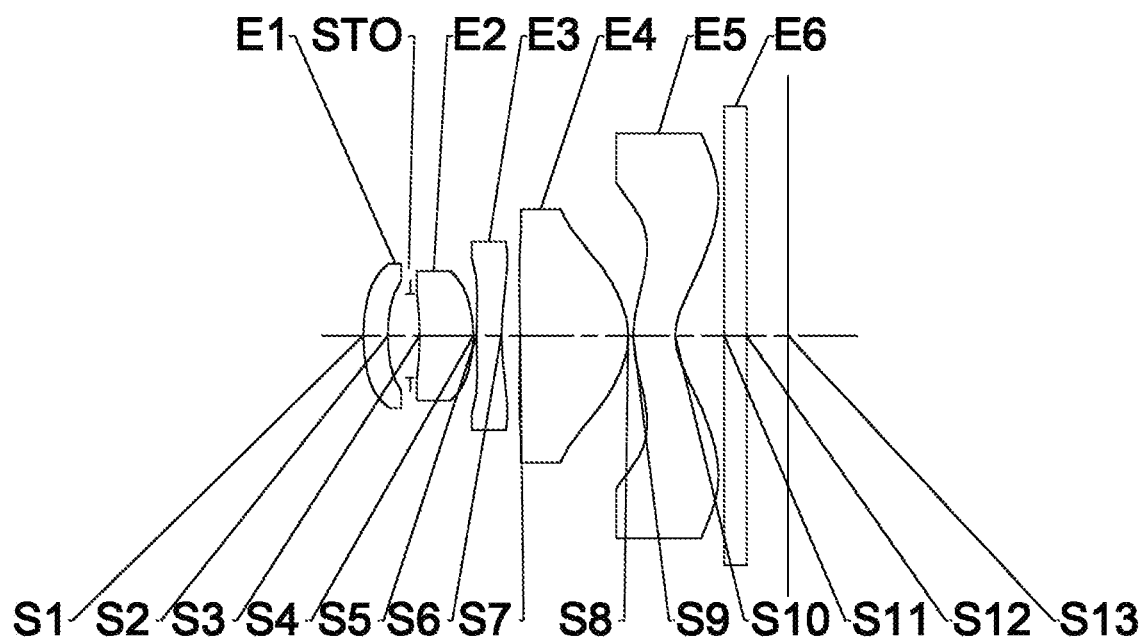
FIG. 3 illustrates a schematic structural view of a camera lens group according to example 2 of the present disclosure.

A camera lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is a convex surface, and an image-side surface S2 thereof is a concave surface. The second lens E2 has positive refractive power, an object-side surface S3 thereof is a concave surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.85 mm, a total length TTL of the camera lens group is 3.97 mm, half of a diagonal length ImgH of an effective pixel area on the imaging plane S13 of the camera lens group is 2.42 mm, half of a maximal field-of-view Semi-FOV of the camera lens group is 55.0°, and an aperture value Fno of the camera lens group is 2.21.

Table 3 is a table illustrating basic parameters of the camera lens group of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 1.9211 | 0.2300 | 1.55 | 56.1 | 1995.48 | 1.6712 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S2 | Aspheric | 1.8432 | 0.2109 | | | | −3.4006 |
| STO | Spherical | Infinite | 0.0850 | | | | |
| S3 | Aspheric | −4.8179 | 0.5036 | 1.55 | 56.1 | 2.96 | 98.8601 |
| S4 | Aspheric | −1.2554 | 0.0300 | | | | −1.4130 |
| S5 | Aspheric | 4.6258 | 0.2300 | 1.67 | 20.4 | −5.25 | 28.5114 |
| S6 | Aspheric | 1.9522 | 0.1748 | | | | 1.7109 |
| S7 | Aspheric | −7.9594 | 1.0092 | 1.54 | 55.9 | 1.53 | 57.3527 |
| S8 | Aspheric | −0.7774 | 0.0471 | | | | −1.0887 |
| S9 | Aspheric | 1.0062 | 0.3910 | 1.62 | 23.5 | −2.51 | −1.6483 |
| S10 | Aspheric | 0.5258 | 0.4592 | | | | −2.6594 |
| S11 | Spherical | Infinite | 0.2100 | 1.52 | 64.2 | | |
| S12 | Spherical | Infinite | 0.3858 | | | | |
| S13 | Spherical | Infinite | | | | | |

TABLE 4

| Surface number | A4 | A6 | A8 | A10 | A12 |
|---|---|---|---|---|---|
| S1 | 4.2192E−01 | −9.5142E−01 | 9.5061E+00 | −5.2322E+01 | 1.9174E+02 |
| S2 | 9.8218E−01 | −8.1986E+00 | 1.4770E+02 | −1.6692E+03 | 1.2275E+04 |
| S3 | −6.6104E−02 | 4.6498E−01 | −2.4717E+01 | 3.8852E+02 | −3.6908E+03 |
| S4 | −3.2819E−01 | −3.2003E−01 | 7.0889E+00 | −6.7238E+01 | 2.9165E+02 |
| S5 | −5.7563E−01 | −1.6244E−01 | 1.2420E+01 | −9.8509E+01 | 4.2628E+02 |
| S6 | −4.1222E−01 | −6.3032E−01 | 7.6492E+00 | −3.3883E+01 | 8.9315E+01 |
| S7 | 2.5265E−01 | −6.9243E−01 | 1.1235E+00 | 1.7092E+00 | −1.1446E+01 |
| S8 | 9.4045E−02 | 8.2124E−02 | −3.6996E−01 | 1.9795E−01 | 1.0616E+00 |
| S9 | −6.4859E−01 | 7.5130E−01 | −9.5354E−01 | 1.0469E+00 | −8.4363E−01 |
| S10 | −3.7453E−01 | 4.5559E−01 | −4.3796E−01 | 3.1062E−01 | −1.5763E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5368E+00 | 2.6002E+00 | −1.2816E+00 | 2.4294E−01 |
| S9 | 4.2312E−01 | −1.1762E−01 | 1.6043E−02 | −8.5023E−04 |
| S10 | 5.4362E−02 | −1.1962E−02 | 1.5098E−03 | −8.3053E−05 |

Figure 4A:
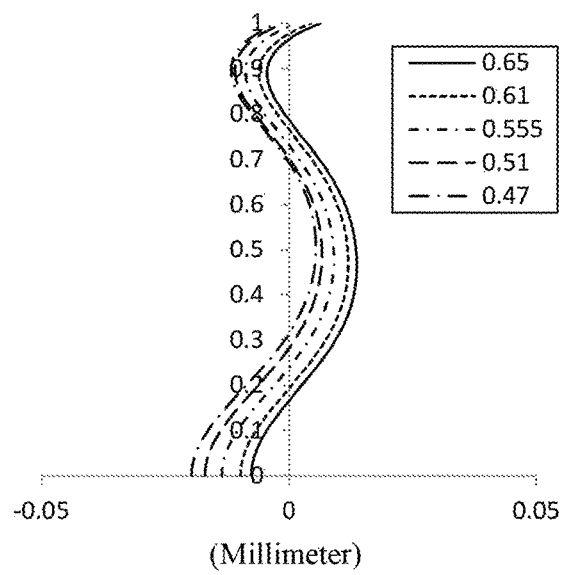
FIGS. 4A to 4D illustrate a longitudinal aberration curve, an astigmatic curve, a distortion curve, and a lateral color curve of the camera lens group of the example 2, respectively.
Figure 4B:
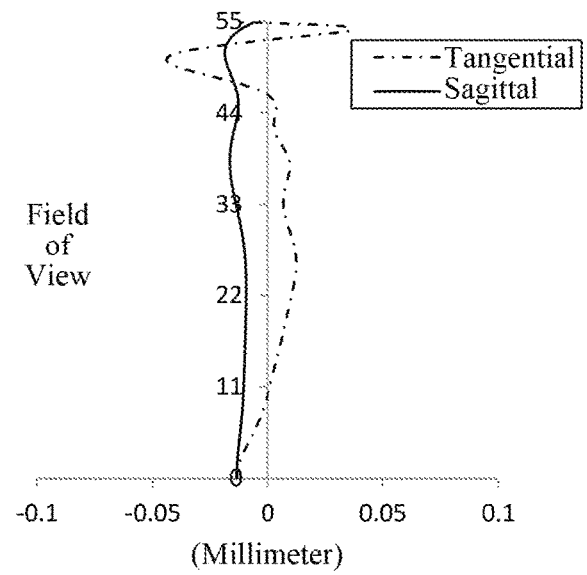
Figure 4C:
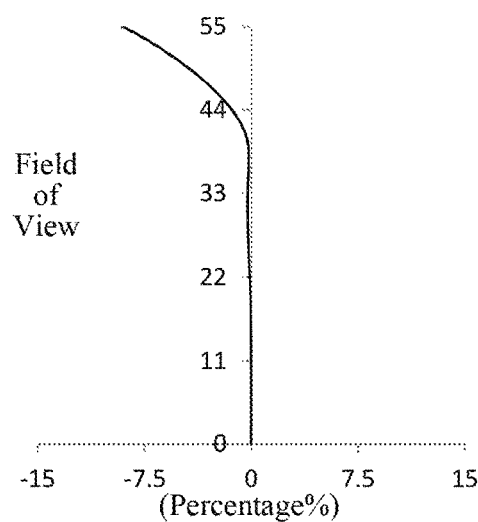
Figure 4D:
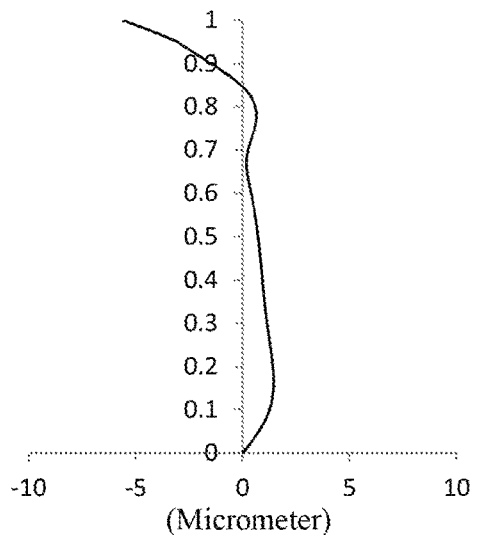

FIG. 4A illustrates a longitudinal aberration curve of the camera lens group according to example 2, representing deviations of focal points converged by light of different wavelengths after passing through the lens assembly. FIG. 4B illustrates an astigmatic curve of the camera lens group according to example 2, representing a curvature of a tangential plane and a curvature of a sagittal plane. FIG. 4C illustrates a distortion curve of the camera lens group according to example 2, representing amounts of distortion corresponding to different field-of-views. FIG. 4D illustrates a lateral color curve of the camera lens group according to example 2, representing deviations of different image heights on an imaging plane after light passes through the lens assembly. It can be seen from FIG. 4A to FIG. 4D that the camera lens group provided in example 2 may achieve good image quality.

Example 3

Figure 5:
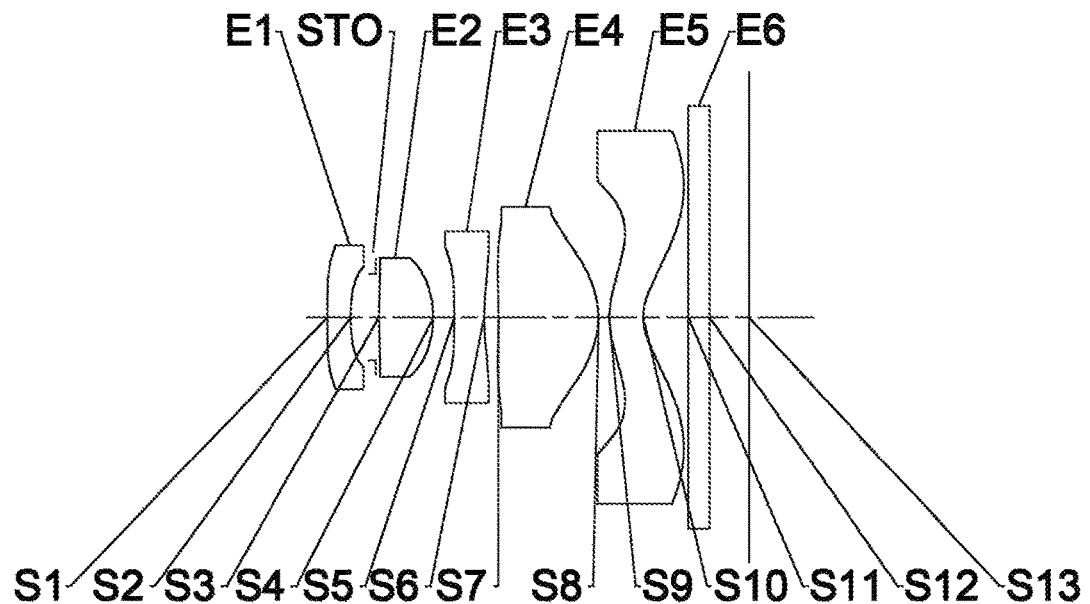
FIG. 5 illustrates a schematic structural view of a camera lens group according to example 3 of the present disclosure.

A camera lens group according to example 3 of the present disclosure is described below with reference to FIG. 5 to FIG. 6D. FIG. 5 shows a schematic structural view of the camera lens group according to example 3 of the present disclosure.

As shown in FIG. 5, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.75 mm, a total length TTL of the camera lens group is 4.15 mm, half of a diagonal length ImgH of an effective pixel area on the imaging plane S13 of the camera lens group is 2.42 mm, half of a maximal field-of-view Semi-FOV of the camera lens group is 55.1°, and an aperture value Fno of the camera lens group is 2.21.

Table 5 is a table illustrating basic parameters of the camera lens group of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

Figures 6A, 6B:
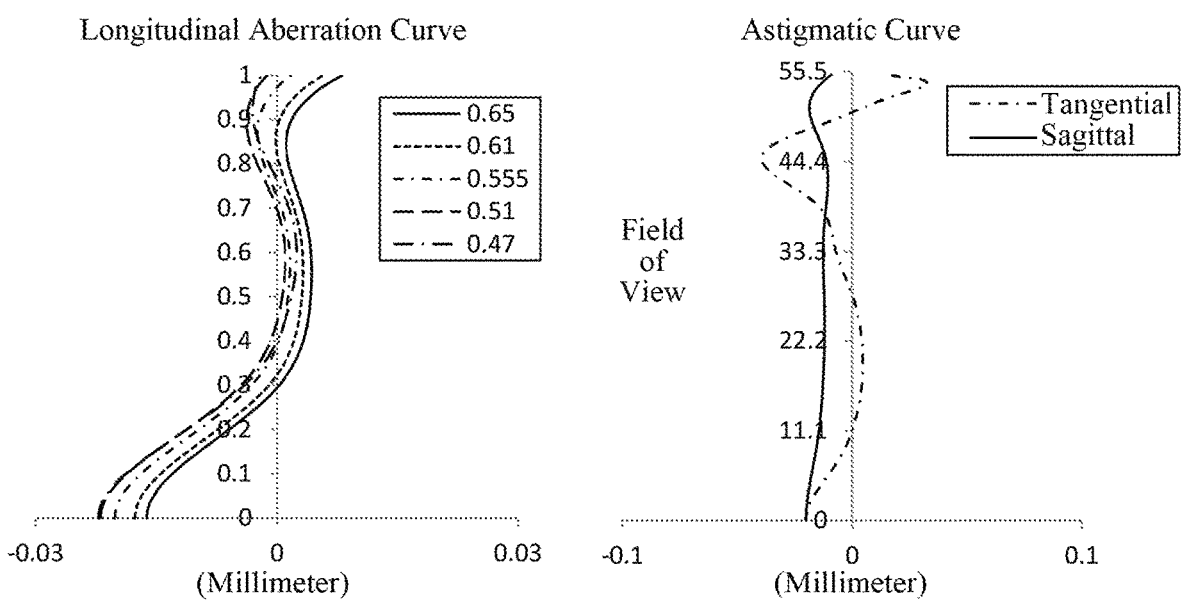
FIGS. 6A to 6D illustrate a longitudinal aberration curve, an astigmatic curve, a distortion curve, and a lateral color curve of the camera lens group of the example 3, respectively.
Figure 6C:
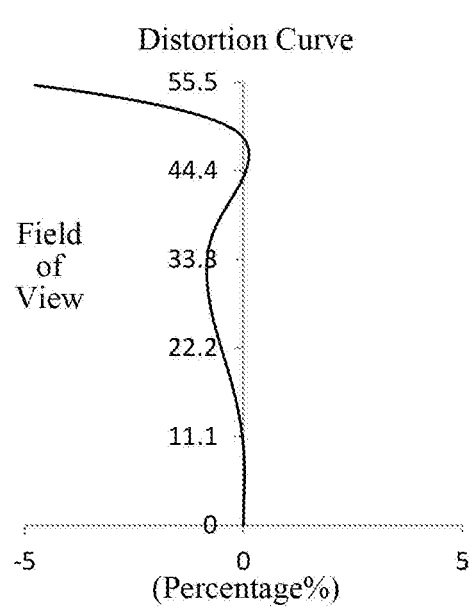
Figure 6D:
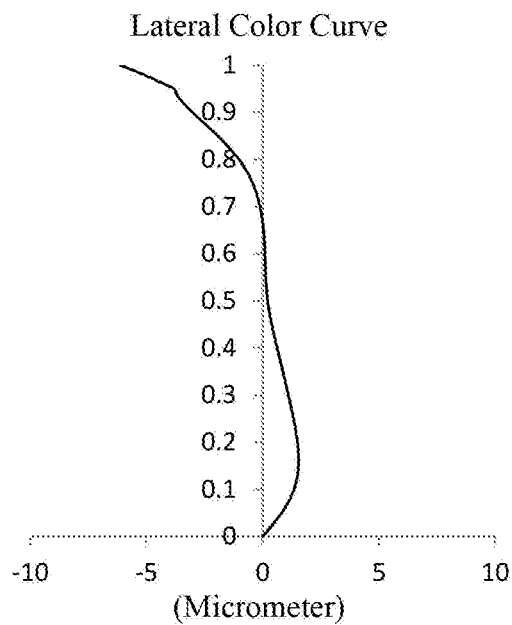

FIG. 6A illustrates a longitudinal aberration curve of the camera lens group according to example 3, representing deviations of focal points converged by light of different wavelengths after passing through the lens assembly. FIG. 6B illustrates an astigmatic curve of the camera lens group according to example 3, representing a curvature of a tangential plane and a curvature of a sagittal plane. FIG. 6C illustrates a distortion curve of the camera lens group according to example 3, representing amounts of distortion corresponding to different field-of-views. FIG. 6D illustrates a lateral color curve of the camera lens group according to example 3, representing deviations of different image heights on an imaging plane after light passes through the lens assembly. It can be seen from FIG. 6A to FIG. 6D that the camera lens group provided in example 3 may achieve good image quality.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −10.0000 | 0.2300 | 1.55 | 56.1 | −3.91 | 83.1295 |
| S2 | Aspheric | 2.7373 | 0.2467 | | | | 10.3254 |
| STO | Spherical | Infinite | 0.0300 | | | | |
| S3 | Aspheric | 6.0202 | 0.5357 | 1.55 | 56.1 | 1.63 | −4.7683 |
| S4 | Aspheric | −1.0135 | 0.2057 | | | | −0.6896 |
| S5 | Aspheric | 31.4176 | 0.2934 | 1.67 | 20.4 | −3.52 | −99.0000 |
| S6 | Aspheric | 2.1753 | 0.1404 | | | | 2.0301 |
| S7 | Aspheric | −7.7541 | 0.9915 | 1.54 | 55.9 | 1.67 | 60.1542 |
| S8 | Aspheric | −0.8415 | 0.1035 | | | | −1.0789 |
| S9 | Aspheric | 0.9017 | 0.3343 | 1.62 | 23.5 | −3.06 | −1.3518 |
| S10 | Aspheric | 0.5287 | 0.4441 | | | | −2.4456 |
| S11 | Spherical | Infinite | 0.2100 | 1.52 | 64.2 | | |
| S12 | Spherical | Infinite | 0.3885 | | | | |
| S13 | Spherical | Infinite | | | | | |

TABLE 6

| Surface number | A4 | A6 | A8 | A10 | A12 |
|---|---|---|---|---|---|
| S1 | 7.5623E−01 | −1.8247E+00 | 1.0210E+01 | −5.3948E+01 | 1.9174E+02 |
| S2 | 1.3458E+00 | −7.4870E+00 | 1.3963E+02 | −1.6427E+03 | 1.2275E+04 |
| S3 | −4.2150E−02 | 1.1310E+00 | −3.1060E+01 | 4.0650E+02 | −3.6908E+03 |
| S4 | −3.5358E−01 | −3.8734E−01 | 7.2384E+00 | −6.6547E+01 | 2.9165E+02 |
| S5 | −6.2481E−01 | −2.1485E−01 | 1.2688E+01 | −9.8233E+01 | 4.2628E+02 |
| S6 | −4.0767E−01 | −5.9259E−01 | 7.6564E+00 | −3.3863E+01 | 8.9315E+01 |
| S7 | 2.7367E−01 | −6.6445E−01 | 1.1138E+00 | 1.6613E+00 | −1.1393E+01 |
| S8 | 9.0218E−02 | 1.0356E−01 | −3.6943E−01 | 1.9890E−01 | 1.0672E+00 |
| S9 | −6.8223E−01 | 7.3559E−01 | −9.5278E−01 | 1.0481E+00 | −8.4316E−01 |
| S10 | −3.8951E−01 | 4.4948E−01 | −4.3391E−01 | 3.1091E−01 | −1.5772E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5289E+00 | 2.5939E+00 | −1.2818E+00 | 2.4294E−01 |
| S9 | 4.2330E−01 | −1.1758E−01 | 1.6041E−02 | −8.6593E−04 |
| S10 | 5.4332E−02 | −1.1967E−02 | 1.5098E−03 | −8.2684E−05 |

Example 4

Figure 7:
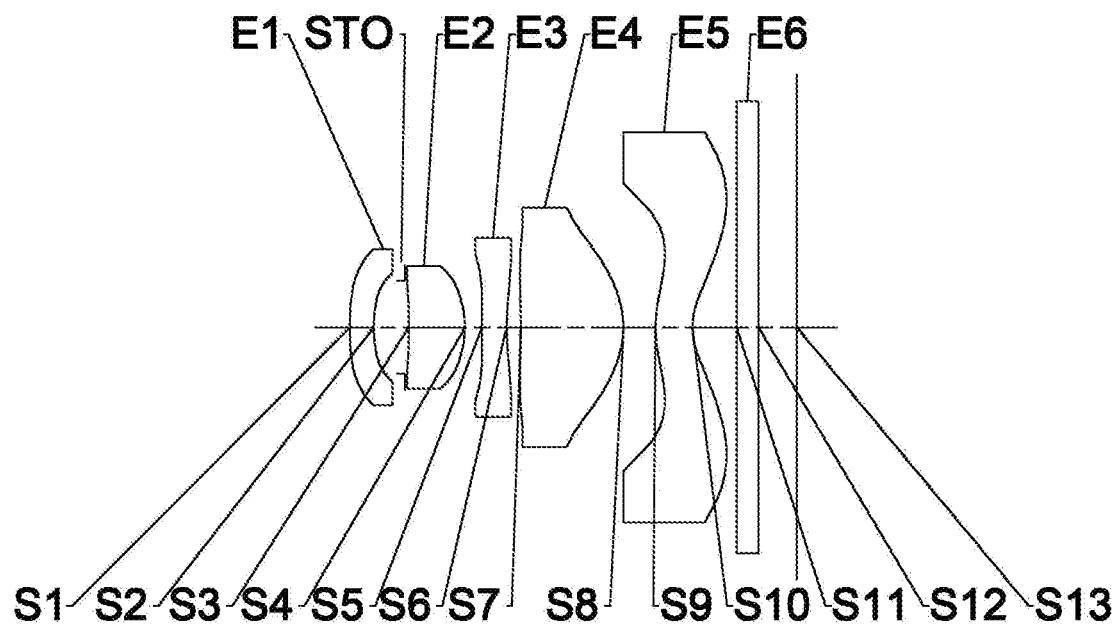
FIG. 7 illustrates a schematic structural view of a camera lens group according to example 4 of the present disclosure.

A camera lens group according to example 4 of the present disclosure is described below with reference to FIG. 7 to FIG. 8D. FIG. 7 shows a schematic structural view of the camera lens group according to example 4 of the present disclosure.

As shown in FIG. 7, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a convex surface, and an image-side surface S2 thereof is a concave surface. The second lens E2 has positive refractive power, an object-side surface S3 thereof is a concave surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.91 mm, a total length TTL of the camera lens group is 4.28 mm, half of a diagonal length ImgH of an effective pixel area on the imaging plane S13 of the camera lens group is 2.42 mm, half of a maximal field-of-view Semi-FOV of the camera lens group is 56.3°, and an aperture value Fno of the camera lens group is 2.21.

Table 7 is a table illustrating basic parameters of the camera lens group of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.9820 | 0.2300 | 1.55 | 56.1 | −5.38 | 12.7456 |
| S2 | Aspheric | 1.6551 | 0.2988 | | | | 5.6020 |
| STO | Spherical | Infinite | 0.0362 | | | | |
| S3 | Aspheric | −20.0000 | 0.5392 | 1.55 | 56.1 | 1.97 | 63.6823 |
| S4 | Aspheric | −1.0282 | 0.1613 | | | | −0.6934 |
| S5 | Aspheric | 7.4887 | 0.2356 | 1.67 | 20.4 | −4.94 | −6.3829 |
| S6 | Aspheric | 2.2552 | 0.1382 | | | | 1.8747 |
| S7 | Aspheric | −7.7361 | 0.9819 | 1.54 | 55.9 | 1.85 | 59.2928 |
| S8 | Aspheric | −0.9191 | 0.3045 | | | | −0.8927 |
| S9 | Aspheric | 1.1487 | 0.3540 | 1.62 | 23.5 | −2.77 | −1.4334 |
| S10 | Aspheric | 0.6141 | 0.4229 | | | | −2.7766 |
| S11 | Spherical | Infinite | 0.2100 | 1.52 | 64.2 | | |
| S12 | Spherical | Infinite | 0.3674 | | | | |
| S13 | Spherical | Infinite | | | | | |

TABLE 8

| Surface number | A4 | A6 | A8 | A10 | A12 |
|---|---|---|---|---|---|
| S1 | 6.2385E−01 | −1.5131E+00 | 1.0314E+01 | −5.4073E+01 | 1.9174E+02 |
| S2 | 1.0907E+00 | −7.3326E+00 | 1.4120E+02 | −1.6481E+03 | 1.2275E+04 |
| S3 | −1.2595E−01 | 6.5025E−01 | −2.7822E+01 | 3.9606E+02 | −3.6908E+03 |
| S4 | −3.6343E−01 | −3.6925E−01 | 7.1386E+00 | −6.6792E+01 | 2.9165E+02 |
| S5 | −6.0787E−01 | −9.5607E−02 | 1.2527E+00 | −9.8348E+01 | 4.2628E+02 |
| S6 | −3.9772E−01 | −6.0042E−01 | 7.6792E+00 | −3.3856E+01 | 8.9315E+01 |
| S7 | 2.3711E−01 | −6.5868E−01 | 1.1301E+00 | 1.6837E+00 | −1.1425E+01 |
| S8 | 7.0863E−02 | 1.1673E−01 | −3.6658E−01 | 1.8954E−01 | 1.0582E+00 |
| S9 | −6.8830E−01 | 7.3206E−01 | −9.5242E−01 | 1.0494E+00 | −8.4248E−01 |
| S10 | −3.8848E−01 | 4.5513E−01 | −4.3593E−01 | 3.1060E−01 | −1.5769E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |

TABLE 8-continued

| | | | | |
|---|---|---|---|---|
| S8 | −2.5356E+00 | 2.6005E+00 | −1.2818E+00 | 2.4294E−01 |
| S9 | 4.2349E−01 | −1.1757E−01 | 1.5998E−02 | −9.0115E−04 |
| S10 | 5.4347E−02 | −1.1964E−02 | 1.5100E−03 | −8.2811E−05 |

Figure 8A:
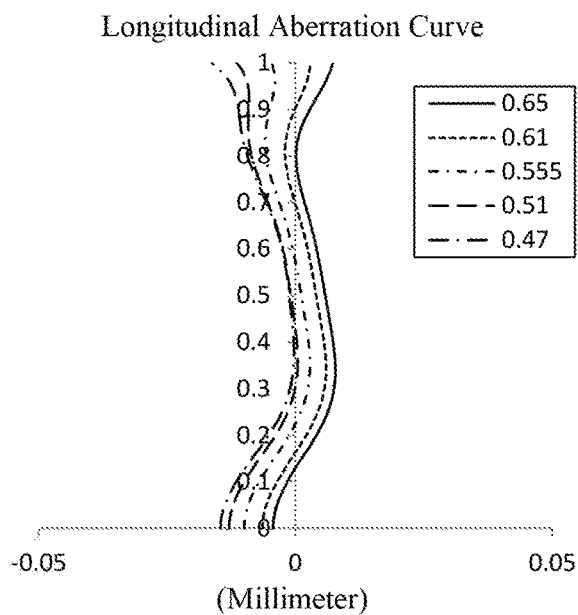
FIGS. 8A to 8D illustrate a longitudinal aberration curve, an astigmatic curve, a distortion curve, and a lateral color curve of the camera lens group of the example 4, respectively.
Figure 8B:
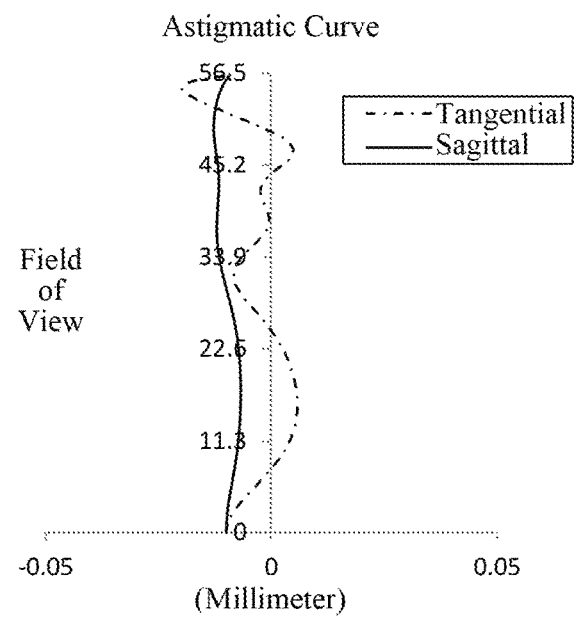
Figure 8C:
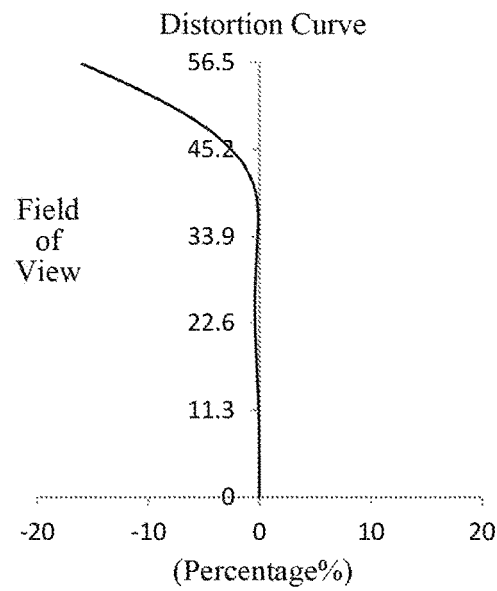
Figure 8D:
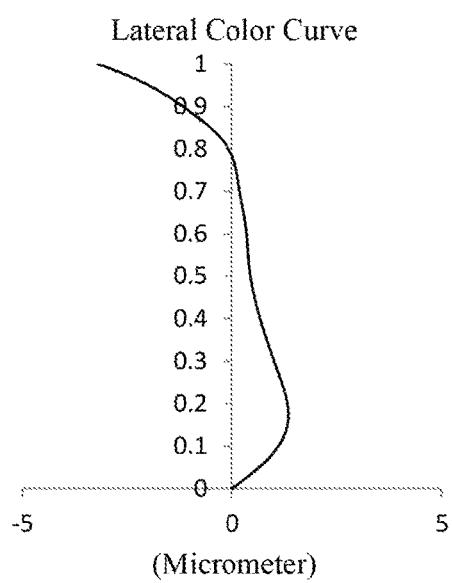

FIG. 8A illustrates a longitudinal aberration curve of the camera lens group according to example 4, representing deviations of focal points converged by light of different wavelengths after passing through the lens assembly. FIG. 8B illustrates an astigmatic curve of the camera lens group according to example 4, representing a curvature of a tangential plane and a curvature of a sagittal plane. FIG. 8C illustrates a distortion curve of the camera lens group according to example 4, representing amounts of distortion corresponding to different field-of-views. FIG. 8D illustrates a lateral color curve of the camera lens group according to example 4, representing deviations of different image heights on an imaging plane after light passes through the lens assembly. It can be seen from FIG. 8A to FIG. 8D that the camera lens group provided in example 4 may achieve good image quality.

Example 5

A camera lens group according to example 5 of the present disclosure is described below with reference to FIG. 9 to FIG. 10D. FIG. 9 shows a schematic structural view of the camera lens group according to example 5 of the present disclosure.

As shown in FIG. 9, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.89 mm, a total length TTL of the camera lens group is 4.24 mm, half of a diagonal length ImgH of an effective pixel area on the imaging plane S13 of the camera lens group is 2.42 mm, half of a maximal field-of-view Semi-FOV of the camera lens group is 55.6°, and an aperture value Fno of the camera lens group is 2.21.

Table 9 is a table illustrating basic parameters of the camera lens group of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.2645 | 0.2300 | 1.55 | 56.1 | −4.34 | 15.7350 |
| S2 | Aspheric | 1.3380 | 0.3123 | | | | 2.2949 |
| STO | Spherical | Infinite | 0.0674 | | | | |
| S3 | Aspheric | 6.2440 | 0.5176 | 1.55 | 56.1 | 2.87 | −1.3046 |
| S4 | Aspheric | −2.0320 | 0.1517 | | | | 3.5792 |
| S5 | Aspheric | 2.0875 | 0.2556 | 1.67 | 20.4 | 20.05 | −15.8435 |
| S6 | Aspheric | 2.3534 | 0.1858 | | | | 1.8885 |
| S7 | Aspheric | −7.1761 | 0.8975 | 1.54 | 55.9 | 1.65 | 52.6087 |
| S8 | Aspheric | −0.8207 | 0.0300 | | | | −1.0569 |
| S9 | Aspheric | 1.4187 | 0.4493 | 1.62 | 23.5 | −2.13 | −2.2561 |
| S10 | Aspheric | 0.6100 | 0.4931 | | | | −3.2905 |
| S11 | Spherical | Infinite | 0.2100 | 1.52 | 64.2 | | |
| S12 | Spherical | Infinite | 0.4375 | | | | |
| S13 | Spherical | Infinite | | | | | |

TABLE 10

| Surface number | A4 | A6 | A8 | A10 | A12 |
|---|---|---|---|---|---|
| S1 | 5.4230E−01 | −1.5656E+00 | 1.0296E+01 | −5.4399E+01 | 1.9174E+02 |
| S2 | 1.0658E+00 | −7.5265E+00 | 1.4326E+02 | −1.6565E+03 | 1.2275E+04 |
| S3 | −8.6836E−02 | 5.0146E−01 | −2.6684E+01 | 3.9490E+02 | −3.6908E+03 |

TABLE 10-continued

| S4 | −7.7575E−01 | 3.5572E−01 | 6.3400E+00 | −6.5830E+01 | 2.9165E+02 |
| S5 | −6.5769E−01 | −2.6411E−01 | 1.2565E+01 | −9.8178E+01 | 4.2628E+02 |
| S6 | −4.0689E−01 | −6.3691E−01 | 7.7122E+00 | −3.3814E+01 | 8.9315E+01 |
| S7 | 1.6982E−01 | −5.9480E−01 | 1.1358E+00 | 1.6276E+00 | −1.1398E+01 |
| S8 | 8.7148E−02 | 6.5591E−02 | −3.7162E−01 | 2.0652E−01 | 1.0729E+00 |
| S9 | −7.1324E−01 | 7.3165E−01 | −9.4870E−01 | 1.0534E+00 | −8.4028E−01 |
| S10 | −3.8461E−01 | 4.5771E−01 | −4.3498E−01 | 3.1049E−01 | −1.5774E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5320E+00 | 2.5848E+00 | −1.2818E+00 | 2.4294E−01 |
| S9 | 4.2419E−01 | −1.1762E−01 | 1.5777E−02 | −1.0236E−03 |
| S10 | 5.4341E−02 | −1.1964E−02 | 1.5103E−03 | −8.2679E−05 |

Figure 10C:
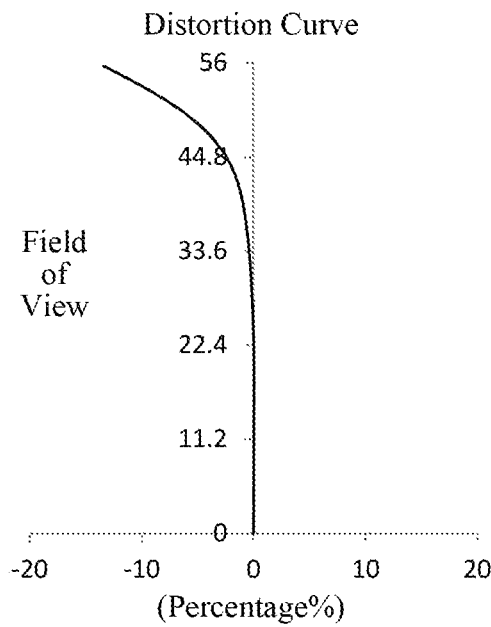
Figure 10D:
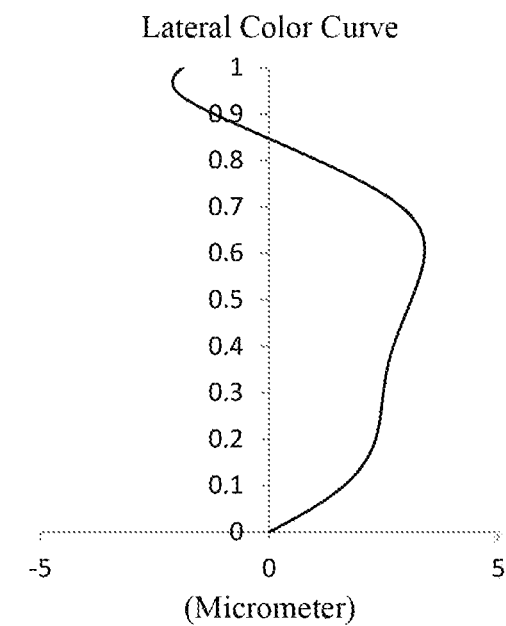

FIG. 10A illustrates a longitudinal aberration curve of the camera lens group according to example 5, representing deviations of focal points converged by light of different wavelengths after passing through the lens assembly. FIG. 10B illustrates an astigmatic curve of the camera lens group according to example 5, representing a curvature of a tangential plane and a curvature of a sagittal plane. FIG. 10C illustrates a distortion curve of the camera lens group according to example 5, representing amounts of distortion corresponding to different field-of-views. FIG. 10D illustrates a lateral color curve of the camera lens group according to example 5, representing deviations of different image heights on an imaging plane after light passes through the lens assembly. It can be seen from FIG. 10A to FIG. 10D that the camera lens group provided in example 5 may achieve good image quality.

Example 6

Figure 11:
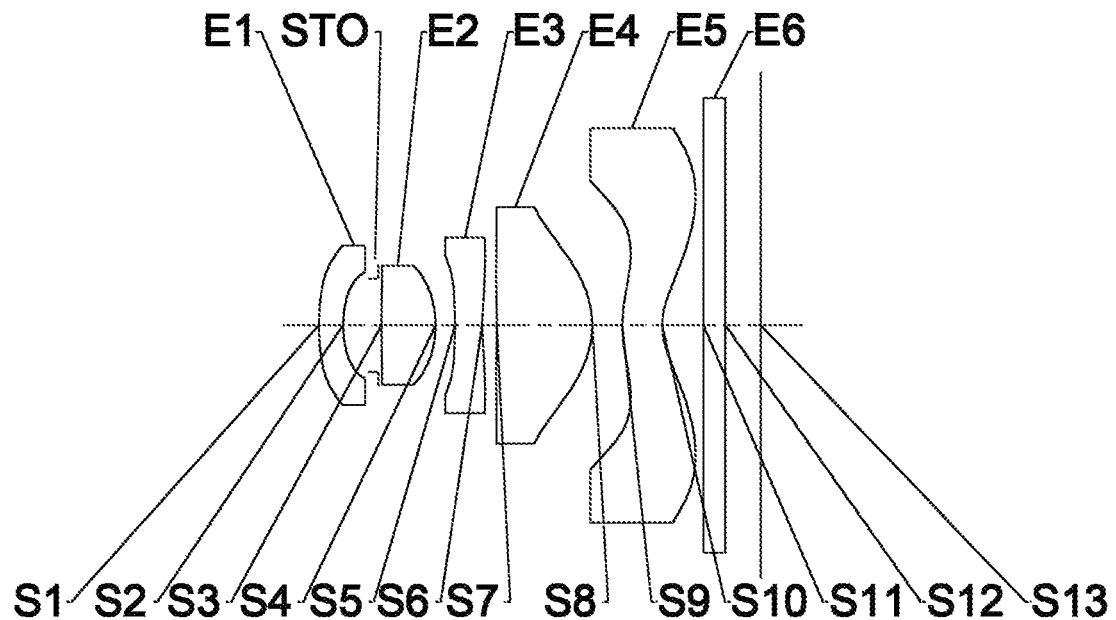
FIG. 11 illustrates a schematic structural view of a camera lens group according to example 6 of the present disclosure.

A camera lens group according to example 6 of the present disclosure is described below with reference to FIG. 11 to FIG. 12D. FIG. 11 shows a schematic structural view of the camera lens group according to example 6 of the present disclosure.

As shown in FIG. 11, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.84 mm, a total length TTL of the camera lens group is 4.24 mm, half of a diagonal length ImgH of an effective pixel area on the imaging plane S13 of the camera lens group is 2.42 mm, half of a maximal field-of-view Semi-FOV of the camera lens group is 57.5°, and an aperture value Fno of the camera lens group is 2.21.

Table 11 is a table illustrating basic parameters of the camera lens group of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| | | | | Material | | | |
| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | 3.9016 | 0.2322 | 1.55 | 56.1 | −4.04 | 21.3341 |
| S2 | Aspheric | 1.3801 | 0.3360 | | | | 5.4799 |
| STO | Spherical | Infinite | 0.0300 | | | | |
| S3 | Aspheric | 7.4982 | 0.5232 | 1.55 | 56.1 | 1.66 | 45.4599 |
| S4 | Aspheric | −1.0052 | 0.1850 | | | | −0.7072 |
| S5 | Aspheric | −20.0000 | 0.2601 | 1.67 | 20.4 | −3.72 | 20.1108 |
| S6 | Aspheric | 2.8454 | 0.1416 | | | | 2.9661 |
| S7 | Aspheric | −7.5222 | 0.9166 | 1.54 | 55.9 | 1.76 | 59.4374 |
| S8 | Aspheric | −0.8745 | 0.2867 | | | | −0.9635 |

TABLE 11-continued

| Surface number | Surface type | Radius of curvature | Thickness/ Distance | Material Refractive index | Abbe number | Focal length | Conic coefficient |
|---|---|---|---|---|---|---|---|
| S9 | Aspheric | 1.2300 | 0.3819 | 1.62 | 23.5 | −2.59 | −1.5268 |
| S10 | Aspheric | 0.6217 | 0.3959 | | | | −2.9810 |
| S11 | Spherical | Infinite | 0.2100 | 1.52 | 64.2 | | |
| S12 | Spherical | Infinite | 0.3404 | | | | |
| S13 | Spherical | Infinite | | | | | |

TABLE 12

| Surface number | A4 | A6 | A8 | A10 | A12 |
|---|---|---|---|---|---|
| S1 | 6.1420E−01 | −1.5900E+00 | 1.0292E+01 | −5.4282E+01 | 1.9174E+02 |
| S2 | 1.0562E+00 | −7.3970E+00 | 1.4080E+02 | −1.6499E+03 | 1.2275E+04 |
| S3 | −9.7567E−02 | 9.9789E−01 | −2.9539E+01 | 4.0410E+02 | −3.6908E+03 |
| S4 | −3.5309E−01 | −4.8209E−01 | 7.5446E+00 | −6.6788E+01 | 2.9165E+02 |
| S5 | −6.1686E−01 | −1.0885E−01 | 1.2524E+01 | −9.8165E+01 | 4.2628E+02 |
| S6 | −3.6435E−01 | −5.8206E−01 | 7.6848E+00 | −3.3877E+01 | 8.9315E+01 |
| S7 | 2.2475E−01 | −6.4829E−01 | 1.1281E+00 | 1.6601E+00 | −1.1408E+01 |
| S8 | 7.1529E−02 | 1.0872E−01 | −3.6459E−01 | 1.9784E−01 | 1.0619E+00 |
| S9 | −6.7677E−01 | 7.3695E−01 | −9.5304E−01 | 1.0491E+00 | −8.4252E−01 |
| S10 | −3.7922E−01 | 4.5373E−01 | −4.3554E−01 | 3.1053E−01 | −1.5771E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5331E+00 | 2.5930E+00 | −1.2818E+00 | 2.4294E−01 |
| S9 | 4.2349E−01 | −1.1758E−01 | 1.6002E−02 | −9.0439E−04 |
| S10 | 5.4345E−02 | −1.1964E−02 | 1.5101E−03 | −8.2771E−05 |

Figure 12A:
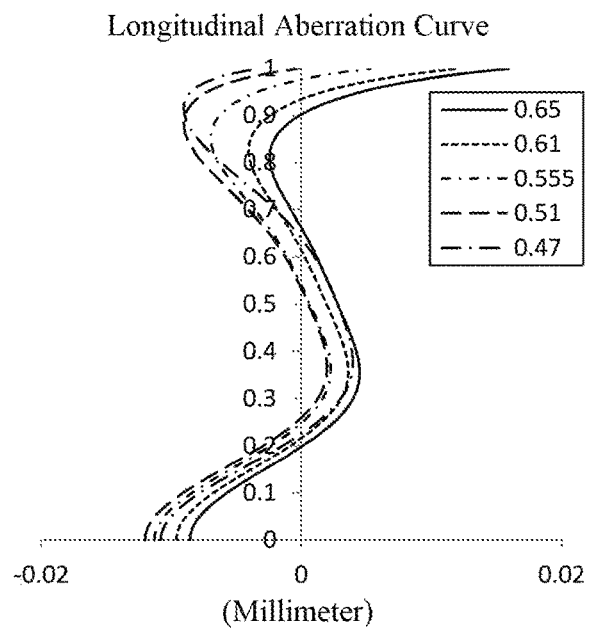
FIGS. 12A to 12D illustrate a longitudinal aberration curve, an astigmatic curve, a distortion curve, and a lateral color curve of the camera lens group of the example 6, respectively.
Figure 12B:
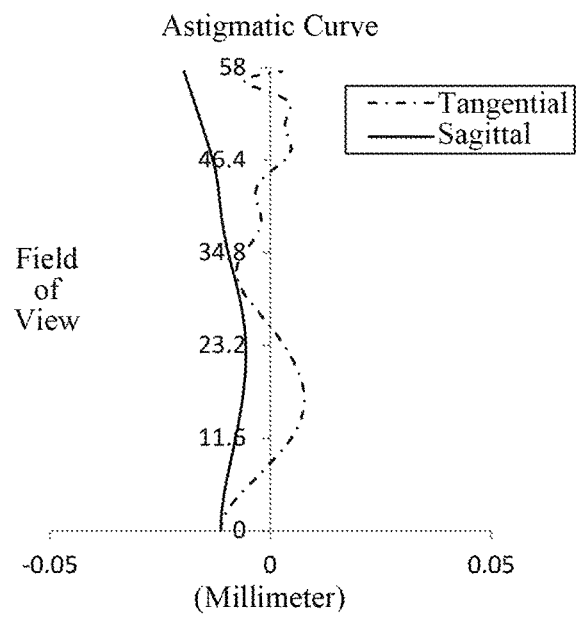
Figure 12C:
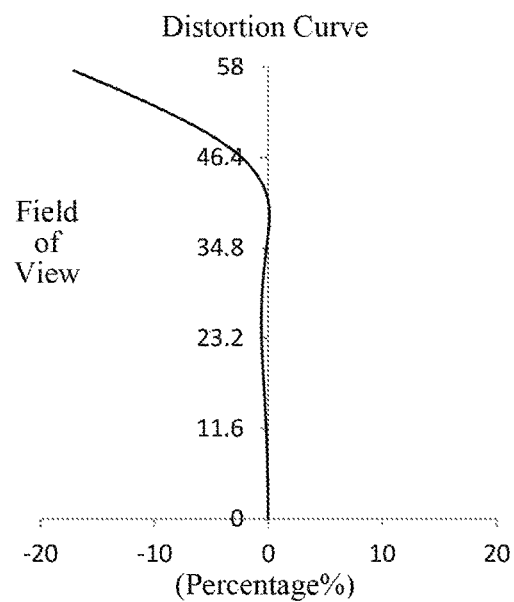
Figure 12D:
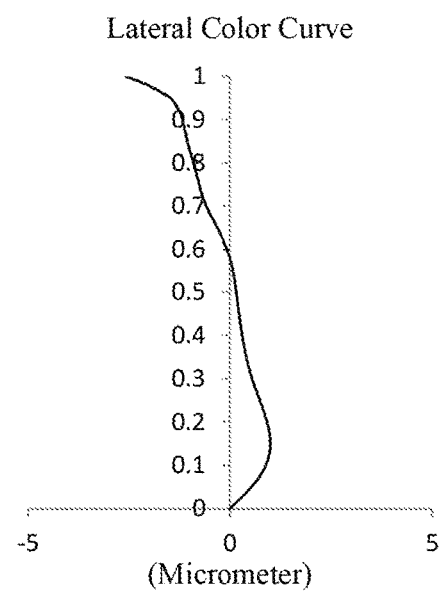

FIG. 12A illustrates a longitudinal aberration curve of the camera lens group according to example 6, representing deviations of focal points converged by light of different wavelengths after passing through the lens assembly. FIG. 12B illustrates an astigmatic curve of the camera lens group according to example 6, representing a curvature of a tangential plane and a curvature of a sagittal plane. FIG. 12C illustrates a distortion curve of the camera lens group according to example 6, representing amounts of distortion corresponding to different field-of-views. FIG. 12D illustrates a lateral color curve of the camera lens group according to example 6, representing deviations of different image heights on an imaging plane after light passes through the lens assembly. It can be seen from FIG. 12A to FIG. 12D that the camera lens group provided in example 6 may achieve good image quality.

Example 7

A camera lens group according to example 7 of the present disclosure is described below with reference to FIG. 13 to FIG. 14D. FIG. 13 shows a schematic structural view of the camera lens group according to example 7 of the present disclosure.

As shown in FIG. 13, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.85 mm, a total length TTL of the camera lens group is 4.22 mm, half of a diagonal length ImgH of an effective pixel area on the imaging plane S13 of the camera lens group is 2.42 mm, half of a maximal field-of-view Semi-FOV of the camera lens group is 55.0°, and an aperture value Fno of the camera lens group is 2.21.

Table 13 is a table illustrating basic parameters of the camera lens group of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.7940 | 0.2300 | 1.55 | 56.1 | −4.24 | 20.8239 |
| S2 | Aspheric | 1.4074 | 0.3219 | | | | 4.5171 |
| STO | Spherical | Infinite | 0.0300 | | | | |
| S3 | Aspheric | 6.1380 | 0.5032 | 1.55 | 56.1 | 1.87 | 11.6648 |
| S4 | Aspheric | −1.1898 | 0.1581 | | | | −0.4479 |
| S5 | Aspheric | 4.8132 | 0.2465 | 1.67 | 20.4 | −4.40 | 16.4511 |
| S6 | Aspheric | 1.7841 | 0.1455 | | | | 1.8485 |
| S7 | Aspheric | 20.0000 | 1.0500 | 1.54 | 55.9 | 1.68 | −99.0000 |
| S8 | Aspheric | −0.9266 | 0.1990 | | | | −1.0165 |
| S9 | Aspheric | 1.2164 | 0.3922 | 1.62 | 23.5 | −2.48 | −1.5603 |
| S10 | Aspheric | 0.6032 | 0.3924 | | | | −2.8858 |
| S11 | Spherical | Infinite | 0.2100 | 1.52 | 64.2 | | |
| S12 | Spherical | Infinite | 0.3369 | | | | |
| S13 | Spherical | Infinite | | | | | |

TABLE 14

| Surface number | A4 | A6 | A8 | A10 | A12 |
|---|---|---|---|---|---|
| S1 | 5.6514E−01 | −1.5583E+00 | 1.0259E+01 | −5.4338E+01 | 1.9174E+02 |
| S2 | 1.0151E+00 | −7.3260E+00 | 1.4106E+02 | −1.6512E+03 | 1.2275E+04 |
| S3 | −8.8040E−02 | 9.8741E−01 | −2.9427E+01 | 4.0363E+02 | −3.6908E+03 |
| S4 | −3.8170E−01 | −3.0932E−01 | 7.0412E+00 | −6.6299E+01 | 2.9165E+02 |
| S5 | −5.9679E−01 | −1.1577E−01 | 1.2608E+01 | −9.8561E+01 | 4.2628E+02 |
| S6 | −3.9057E−01 | −6.0232E−01 | 7.6510E+00 | −3.3893E+01 | 8.9315E+01 |
| S7 | 2.0798E−01 | −6.6067E−01 | 1.1342E+00 | 1.6735E+00 | −1.1436E+01 |
| S8 | 8.1463E−02 | 1.1549E−01 | −3.6962E−01 | 1.9217E+00 | 1.0612E+00 |
| S9 | −6.8277E−01 | 7.3755E−01 | −9.5113E−01 | 1.0499E+00 | −8.4232E−01 |
| S10 | −3.8265E−01 | 4.5577E−01 | −4.3606E−01 | 3.1066E−01 | −1.5771E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5335E+00 | 2.6000E+00 | −1.2818E+00 | 2.4294E−01 |
| S9 | 4.2354E−01 | −1.1757E−01 | 1.5988E−02 | −9.1373E−04 |
| S10 | 5.4342E−02 | −1.1964E−02 | 1.5101E−03 | −8.2757E−05 |

Figure 14C:
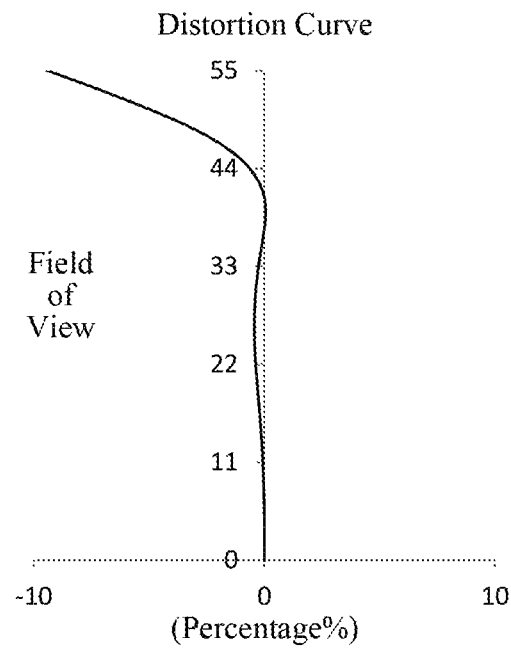
Figure 14D:
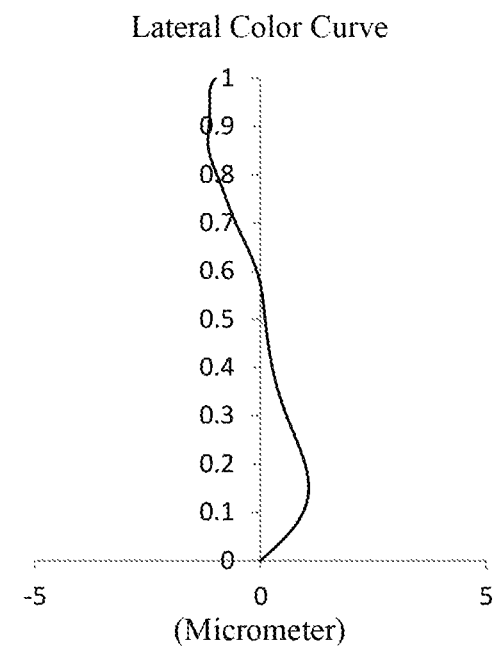

FIG. 14A illustrates a longitudinal aberration curve of the camera lens group according to example 7, representing deviations of focal points converged by light of different wavelengths after passing through the lens assembly. FIG. 14B illustrates an astigmatic curve of the camera lens group according to example 7, representing a curvature of a tangential plane and a curvature of a sagittal plane. FIG. 14C illustrates a distortion curve of the camera lens group according to example 7, representing amounts of distortion corresponding to different field-of-views. FIG. 14D illustrates a lateral color curve of the camera lens group according to example 7, representing deviations of different image heights on an imaging plane after light passes through the lens assembly. It can be seen from FIG. 14A to FIG. 14D that the camera lens group provided in example 7 may achieve good image quality.

Example 8

Figure 15:
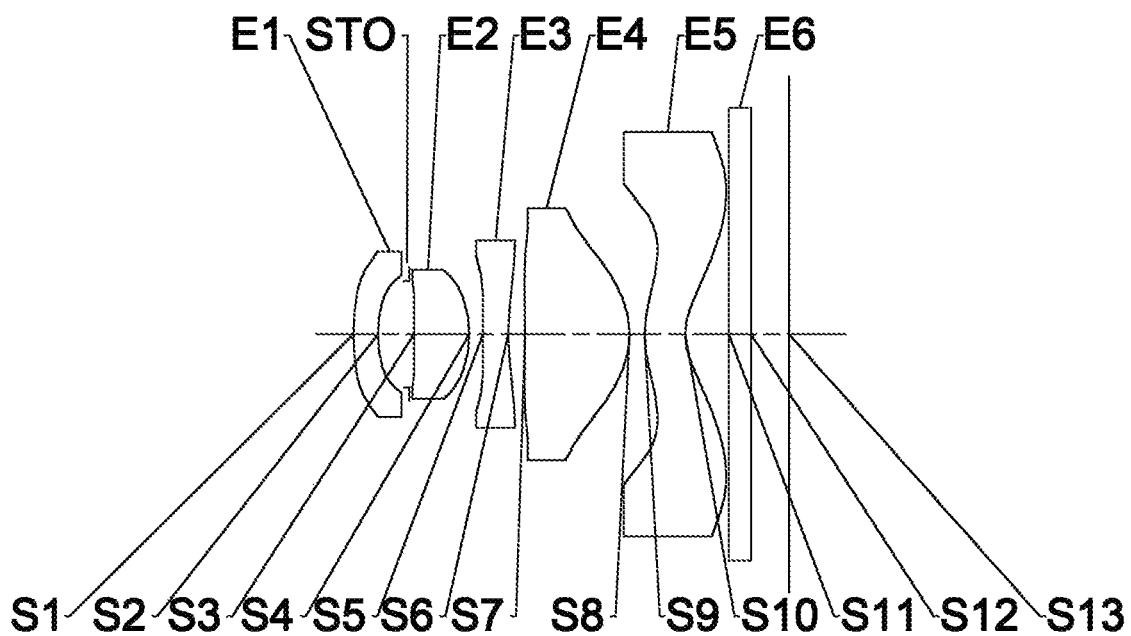
FIG. 15 illustrates a schematic structural view of a camera lens group according to example 8 of the present disclosure.

A camera lens group according to example 8 of the present disclosure is described below with reference to FIG. 15 to FIG. 16D. FIG. 15 shows a schematic structural view of the camera lens group according to example 8 of the present disclosure.

As shown in FIG. 15, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.71 mm, a total length TTL of the camera lens group is 4.11 mm, half of a diagonal length ImgH of an effective pixel area on the imaging plane S13 of the camera lens group is 2.42 mm, half of a maximal field-of-view Semi-FOV of the camera lens group is 59.1°, and an aperture value Fno of the camera lens group is 1.79.

Table 15 is a table illustrating basic parameters of the camera lens group of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | 3.9021 | 0.2300 | 1.55 | 56.1 | −4.97 | 20.4575 |
| S2 | Aspheric | 1.5664 | 0.2961 | | | | 3.1457 |
| STO | Spherical | Infinite | 0.0422 | | | | |
| S3 | Aspheric | 18.5949 | 0.5234 | 1.55 | 56.1 | 1.91 | −99.0000 |
| S4 | Aspheric | −1.0948 | 0.1295 | | | | −0.7556 |
| S5 | Aspheric | 6.9913 | 0.2372 | 1.67 | 20.4 | −4.67 | 24.8204 |
| S6 | Aspheric | 2.1214 | 0.1597 | | | | 2.1675 |
| S7 | Aspheric | −7.9579 | 0.9870 | 1.54 | 55.9 | 1.64 | 59.3984 |
| S8 | Aspheric | −0.8285 | 0.1404 | | | | −0.9926 |
| S9 | Aspheric | 1.0306 | 0.3822 | 1.62 | 23.5 | −2.85 | −1.5472 |
| S10 | Aspheric | 0.5641 | 0.4125 | | | | −2.7317 |
| S11 | Spherical | Infinite | 0.2100 | 1.52 | 64.2 | | |
| S12 | Spherical | Infinite | 0.3569 | | | | |
| S13 | Spherical | Infinite | | | | | |

TABLE 16

| Surface number | A4 | A6 | A8 | A10 | A12 |
|---|---|---|---|---|---|
| S1 | 5.7474E−01 | −1.5483E+00 | 1.0257E+01 | −5.4250E+01 | 1.9174E+02 |
| S2 | 1.1067E+00 | −7.4557E+00 | 1.4201E+02 | −1.6517E+03 | 1.2275E+04 |
| S3 | −1.0557E−01 | 8.6199E−01 | −2.8389E+01 | 3.9880E+02 | −3.6908E+03 |
| S4 | −3.5873E−01 | −2.4665E−01 | 7.0152E+00 | −6.6633E+01 | 2.9165E+02 |
| S5 | −5.9592E−01 | −1.0775E−01 | 1.2681E+01 | −9.8635E+01 | 4.2628E+02 |
| S6 | −3.7689E−01 | −5.9897E−01 | 7.6418E+00 | −3.3863E+01 | 8.9315E+01 |
| S7 | 2.6759E−01 | −6.7796E−01 | 1.1188E+00 | 1.6807E+00 | −1.1422E+01 |
| S8 | 7.7270E−02 | 1.1283E−01 | −3.6703E−01 | 1.9422E−01 | 1.0591E+00 |
| S9 | −6.5889E−01 | 7.4369E−01 | −9.5483E−01 | 1.0476E+00 | −8.4300E−01 |
| S10 | −3.7150E−01 | 4.5181E−01 | −4.3545E−01 | 3.1059E−01 | −1.5771E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5369E+00 | 2.6002E+00 | −1.2818E+00 | 2.4294E−01 |
| S9 | 4.2338E−01 | −1.1757E−01 | 1.6017E−02 | −8.7345E−04 |
| S10 | 5.4347E−02 | −1.1963E−02 | 1.5102E−03 | −8.2825E−05 |

Figure 16A:
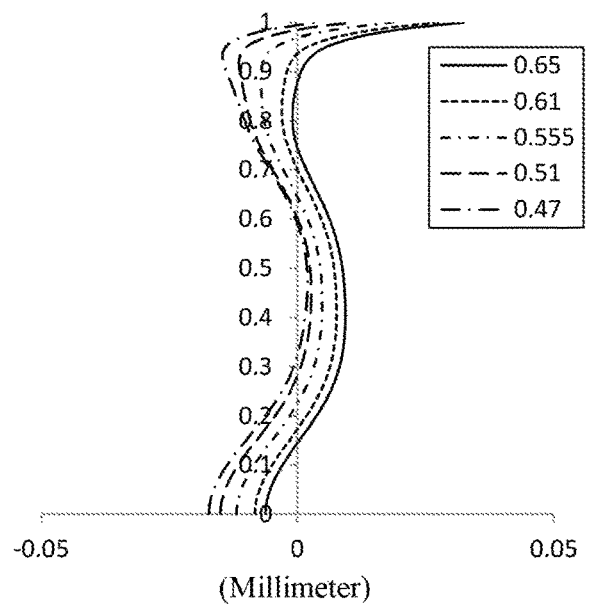
FIGS. 16A to 16D illustrate a longitudinal aberration curve, an astigmatic curve, a distortion curve, and a lateral color curve of the camera lens group of the example 8, respectively.
Figure 16B:
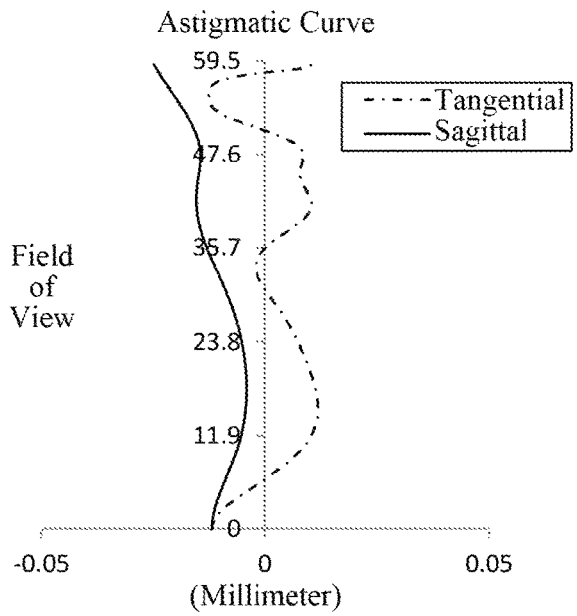
Figure 16C:
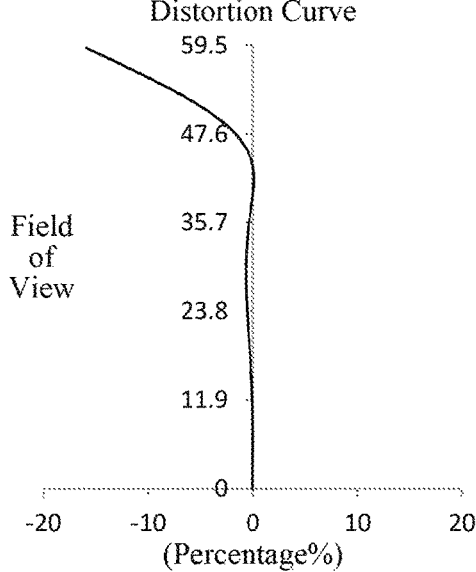
Figure 16D:
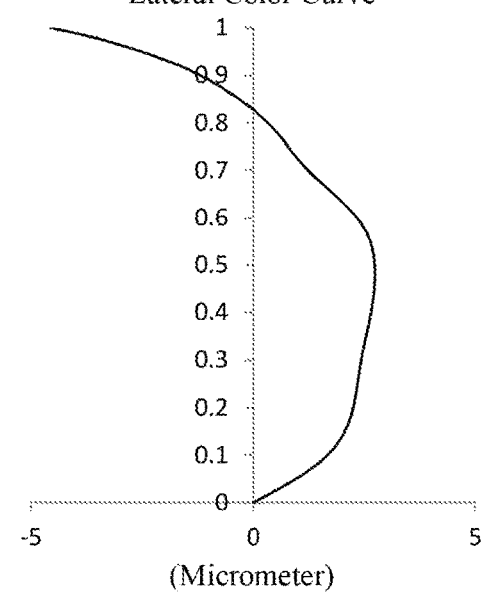

FIG. 16A illustrates a longitudinal aberration curve of the camera lens group according to example 8, representing deviations of focal points converged by light of different wavelengths after passing through the lens assembly. FIG. 16B illustrates an astigmatic curve of the camera lens group according to example 8, representing a curvature of a tangential plane and a curvature of a sagittal plane. FIG. 16C illustrates a distortion curve of the camera lens group according to example 8, representing amounts of distortion corresponding to different field-of-views. FIG. 16D illustrates a lateral color curve of the camera lens group according to example 8, representing deviations of different image heights on an imaging plane after light passes through the lens assembly. It can be seen from FIG. 16A to FIG. 16D that the camera lens group provided in example 8 may achieve good image quality.

In view of the above, examples 1 to 8 respectively satisfy the relationship shown in Table 17.

TABLE 17

| Conditional/Example | 1 | 2 | 3 | 4 | 5 | 6 | 7 | 8 |
|---|---|---|---|---|---|---|---|---|
| $\tan^2$(Semi-FOV)/DT11 (mm$^{-1}$) | 4.85 | 3.02 | 2.90 | 3.01 | 2.88 | 3.23 | 2.74 | 3.59 |
| TTL/ImgH*f (mm) | 2.62 | 3.03 | 3.01 | 3.37 | 3.31 | 3.23 | 3.22 | 2.90 |
| f2/f | 1.07 | 1.60 | 0.93 | 1.03 | 1.52 | 0.90 | 1.01 | 1.12 |
| R9/R10 | 1.69 | 1.91 | 1.71 | 1.87 | 2.33 | 1.98 | 2.02 | 1.83 |
| CT3/T34 | 1.61 | 1.32 | 2.09 | 1.70 | 1.38 | 1.84 | 1.69 | 1.49 |
| R6/CT3 | 10.51 | 8.49 | 7.41 | 9.57 | 9.21 | 10.94 | 7.24 | 8.94 |
| (SAG42 + SAG51)/(SAG42 − SAG51) | 1.51 | 1.67 | 1.62 | 3.58 | 2.73 | 3.44 | 3.97 | 1.96 |
| ΣAT/TD | 0.23 | 0.19 | 0.23 | 0.29 | 0.24 | 0.30 | 0.26 | 0.25 |
| (DT11 + DT12)/(DT11 − DT12) | 4.94 | 7.43 | 5.55 | 5.68 | 5.63 | 5.05 | 5.49 | 5.95 |
| (R6 + R9)/(R6 − R9) | 2.13 | 3.13 | 2.42 | 3.08 | 4.04 | 2.52 | 5.29 | 2.89 |
| $\tan^2$(Semi-FOV) | 3.76 | 2.04 | 2.06 | 2.25 | 2.14 | 2.47 | 2.04 | 2.80 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, sequentially from an object side to an image side of the camera lens group along an optical axis, comprising:
    a first lens having refractive power with a concave image-side surface;
    a stop;
    a second lens having positive refractive power with a convex image-side surface;
    a third lens having refractive power with a concave image-side surface;
    a fourth lens having positive refractive power with a convex image-side surface; and
    a fifth lens having negative refractive power with a convex object-side surface and a concave image-side surface,
    wherein 2.50 mm$^{-1}$<$\tan^2$(Semi-FOV)/DT11<5.00 mm$^{-1}$,
    where DT11 is a maximum effective radius of an object-side surface of the first lens, and Semi-FOV is half of a maximal field-of-view of the camera lens group.

2. The camera lens group according to claim 1, wherein 2.50 mm<TTL/ImgH*f<4.00 mm,
    where TTL is a distance along the optical axis from the object-side surface of the first lens to an imaging plane of the camera lens group, ImgH is half of a diagonal length of an effective pixel area on the imaging plane of the camera lens group, and f is a total effective focal length of the camera lens group.

3. The camera lens group according to claim 1, wherein 0.50<f2/f<2.00,
    where f2 is an effective focal length of the second lens, and f is a total effective focal length of the camera lens group.

4. The camera lens group according to claim 1, wherein 1.50<R9/R10<2.50,
    where R9 is a radius of curvature of the object-side surface of the fifth lens, and R10 is a radius of curvature of the image-side surface of the fifth lens.

5. The camera lens group according to claim 1, wherein 1.00<CT3/T34<2.50,
    where CT3 is a center thickness of the third lens along the optical axis, and T34 is a spaced interval between the third lens and the fourth lens along the optical axis.

6. The camera lens group according to claim 1, wherein 7.00<R6/CT3<11.00,
    where R6 is a radius of curvature of the image-side surface of the third lens, and CT3 is a center thickness of the third lens along the optical axis.

7. The camera lens group according to claim 1, wherein 1.00<(SAG42+SAG51)/(SAG42−SAG51)<4.00,
    where SAG42 is a distance along the optical axis from an intersection of the image-side surface of the fourth lens and the optical axis to a vertex of an effective radius of the image-side surface of the fourth lens, and SAG51 is a distance along the optical axis from an intersection of the object-side surface of the fifth lens and the optical axis to a vertex of an effective radius of the object-side surface of the fifth lens.

8. The camera lens group according to claim 1, wherein ΣAT/TD≤0.30,
    where TD is a distance along the optical axis from the object-side surface of the first lens to the image-side surface of the fifth lens, and ΣAT is a sum of spaced intervals along the optical axis between each two adjacent lenses of the first lens to the fifth lens.

9. The camera lens group according to claim 1, wherein 2.00<(R6+R9)/(R6−R9)<5.50,
where R6 is a radius of curvature of the image-side surface of the third lens, and R9 is a radius of curvature of the object-side surface of the fifth lens.

10. The camera lens group according to claim 1, wherein 2.00<tan$^2$(Semi-FOV)<4.00,
where Semi-FOV is half of the maximal field-of-view of the camera lens group.

11. A camera lens group, sequentially from an object side to an image side of the camera lens group along an optical axis, comprising:
a first lens having refractive power with a concave image-side surface;
a stop;
a second lens having positive refractive power with a convex image-side surface;
a third lens having refractive power with a concave image-side surface;
a fourth lens having positive refractive power with a convex image-side surface; and
a fifth lens having negative refractive power with a convex object-side surface and a concave image-side surface,
wherein 4.50<(DT11+DT12)/(DT11−DT12)<8.00,
where DT11 is a maximum effective radius of an object-side surface of the first lens, and DT12 is a maximum effective radius of the image-side surface of the first lens.

12. The camera lens group according to claim 11, wherein 0.50<f2/f<2.00,
where f2 is an effective focal length of the second lens, and f is a total effective focal length of the camera lens group.

13. The camera lens group according to claim 11, wherein 1.50<R9/R10<2.50,
where R9 is a radius of curvature of the object-side surface of the fifth lens, and R10 is a radius of curvature of the image-side surface of the fifth lens.

14. The camera lens group according to claim 11, wherein 1.00<CT3/T34<2.50,
where CT3 is a center thickness of the third lens along the optical axis, and T34 is a spaced interval between the third lens and the fourth lens along the optical axis.

15. The camera lens group according to claim 11, wherein 7.00<R6/CT3<11.00,
where R6 is a radius of curvature of the image-side surface of the third lens, and CT3 is a center thickness of the third lens along the optical axis.

16. The camera lens group according to claim 11, wherein 1.00<(SAG42+SAG51)/(SAG42−SAG51)<4.00,
where SAG42 is a distance along the optical axis from an intersection of the image-side surface of the fourth lens and the optical axis to a vertex of an effective radius of the image-side surface of the fourth lens, and SAG51 is a distance along the optical axis from an intersection of the object-side surface of the fifth lens and the optical axis to a vertex of an effective radius of the object-side surface of the fifth lens.

17. The camera lens group according to claim 11, wherein 2.00<(R6+R9)/(R6−R9)<5.50,
where R6 is a radius of curvature of the image-side surface of the third lens, and R9 is a radius of curvature of the object-side surface of the fifth lens.

18. The camera lens group according to claim 11, wherein 2.00<tan$^2$(Semi-FOV)<4.00,
where Semi-FOV is half of a maximal field-of-view of the camera lens group.

19. The camera lens group according to claim 11, wherein 2.50 mm<TTL/ImgH*f<4.00 mm,
where TTL is a distance along the optical axis from the object-side surface of the first lens to an imaging plane of the camera lens group, ImgH is half of a diagonal length of an effective pixel area on the imaging plane of the camera lens group, and f is a total effective focal length of the camera lens group.

20. The camera lens group according to claim 11, wherein ΣAT/TD≤0.30,
where TD is a distance along the optical axis from the object-side surface of the first lens to the image-side surface of the fifth lens, and ΣAT is a sum of spaced intervals along the optical axis between each two adjacent lenses of the first lens to the fifth lens.

* * * * *